(12) United States Patent
Yang et al.

(10) Patent No.: US 12,262,432 B2
(45) Date of Patent: Mar. 25, 2025

(54) LINK IDENTIFIER INDICATION METHOD, TRANSCEIVE CAPABILITY INDICATION METHOD, AND RELATED DEVICE

(71) Applicant: Huawei Technologies Co., Ltd., Shenzhen (CN)

(72) Inventors: Mao Yang, Xi'an (CN); Zhongjiang Yan, Xi'an (CN); Yifan Zhou, Shenzhen (CN); Yunbo Li, Shenzhen (CN); Guogang Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 357 days.

(21) Appl. No.: 17/743,639

(22) Filed: May 13, 2022

(65) Prior Publication Data

US 2022/0272783 A1  Aug. 25, 2022

Related U.S. Application Data

(63) Continuation of application No. PCT/CN2020/128731, filed on Nov. 13, 2020.

(30) Foreign Application Priority Data

Nov. 15, 2019  (CN) .......................... 201911122636.2

(51) Int. Cl.
*H04W 76/15* (2018.01)
*H04L 5/00* (2006.01)
*H04W 76/11* (2018.01)

(52) U.S. Cl.
CPC ........... *H04W 76/15* (2018.02); *H04L 5/0046* (2013.01); *H04L 5/0048* (2013.01); *H04W 76/11* (2018.02)

(58) Field of Classification Search
CPC .............................. H04W 76/15; H04W 76/11
See application file for complete search history.

(56) References Cited

U.S. PATENT DOCUMENTS

| | | | |
|---|---|---|---|
| 2019/0082373 | A1 | 3/2019 | Patil et al. |
| 2019/0268956 | A1 | 8/2019 | Xiao et al. |
| 2019/0335454 | A1 | 10/2019 | Huang et al. |

(Continued)

FOREIGN PATENT DOCUMENTS

| | | |
|---|---|---|
| CN | 105589506 A | 5/2016 |
| CN | 110418409 A | 11/2019 |
| CN | 112188644 A | 1/2021 |
| CN | 112218363 A | 1/2021 |
| EP | 3787358 A1 | 3/2021 |

(Continued)

OTHER PUBLICATIONS

IEEE 802.11-19/1159r0, Liwen Chu et al., "Multiple Link Operation Capability Announcement," Jul. 6, 2019, 5 pages.

(Continued)

*Primary Examiner* — Won Tae C Kim
(74) *Attorney, Agent, or Firm* — Conley Rose, P.C.

(57) ABSTRACT

A link identifier indication method includes: A multi-link device working on a plurality of links sends a radio frame, where the radio frame includes link information of at least one link in the plurality of links, and link information of one link is used to indicate the link and corresponds to a link identifier of the link; a receiving device that receives the radio frame may determine the link identifier of the link corresponding to the link information, so that in communication of the multi-link device, a link can be identified by using the link identifier.

20 Claims, 14 Drawing Sheets

(56) References Cited

U.S. PATENT DOCUMENTS

| | | | |
|---|---|---|---|
| 2021/0076413 A1* | 3/2021 | Lu | H04W 74/002 |
| 2022/0132610 A1 | 4/2022 | Guo et al. | |
| 2022/0240333 A1* | 7/2022 | Jang | H04L 69/24 |

FOREIGN PATENT DOCUMENTS

| | | |
|---|---|---|
| EP | 3993520 A1 | 5/2022 |
| WO | 2011135392 A1 | 11/2011 |
| WO | 2019050704 A1 | 3/2019 |

OTHER PUBLICATIONS

IEEE Std 802.11-2016, "IEEE Standard for Information technology—Telecommunications and information exchange between systems Local and metropolitan area networks—Specific requirements, Part 11: Wireless LAN Medium Access Control (MAC) and Physical Layer (PHY) Specifications," Dec. 7, 2016, 3534 pages.

IEEE P802.11ax/D4.3, "Draft Standard for Information technology—Tele-communications and information exchange between systems Local and metropolitan area networks—Specific requirements," Aug. 2019, 782 pages.

IEEE P802.11-REVmdTM/D2.2, May 2019, "Draft Standard for Information technology—Telecommunications and Information exchange between systems Local and metropolitan area networks—Specific requirements," with the related pp. 1305-1307, 4 pages.

Liwen Chu et al., "Multiple Band Operation Discussion," IEEE 802.11-19/0821r0, May 14, 2019, 7 pages.

Yifan Zhou(Huawei) et al., "Simultaneous Tx/Rx Capability indication for multi-link operation",Doc.: IEEE 802.11-19/1550r0,Sep. 2019,XP068153778, total 10 pages.

* cited by examiner

LINK IDENTIFIER INDICATION METHOD, TRANSCEIVE CAPABILITY INDICATION METHOD, AND RELATED DEVICE

CROSS-REFERENCE TO RELATED APPLICATIONS

This is a continuation of Int'l Patent App. No. PCT/CN2020/128731 filed on Nov. 13, 2020, which claims priority to Chinese Patent App. No. 201911122636.2 filed on Nov. 15, 2019, both of which are incorporated by reference.

FIELD

The present disclosure relates to the field of wireless communications technologies, and in particular, to a link identifier indication method, a transceive capability indication method, and a related device.

BACKGROUND

With development of wireless technologies, a multi-link device can support multi-link communication, for example, perform communication on 2.4 gigahertz (GHz), 5 GHz, and 60 GHz bands simultaneously. Even if a quantity of antennas is limited, the multi-link device can perform switching on different bands, to select an optimal band, thereby ensuring communication quality of the multi-link device. A plurality of links exist between multi-link devices. However, sending on one link may affect receiving on another link. In communication between multi-link devices, links used by both communication parties need to be determined, to implement accurate transceiving, and improve communication efficiency. However, because the multi-link devices work on a relatively large quantity of links, signaling overheads for indicating links are usually relatively high.

SUMMARY

Embodiments provide a link identifier indication method, a transceive capability indication method, and a related device, to reduce signaling overheads, and improve data transmission efficiency.

According to a first aspect, an embodiment provides a link identifier indication method, including: A first multi-link device generates a radio frame, where the first multi-link device works on a plurality of links; and the first multi-link device sends the radio frame, where the radio frame includes link information of at least one link in the plurality of links, and link information of one link is used to indicate the link and corresponds to a link identifier of the link. By allocating the link identifier and making the link identifier correspond to the link information, a link supported by the first multi-link device can be indicated by using the link identifier, so that signaling overheads can be reduced and transmission efficiency can be improved.

According to a second aspect, an embodiment provides a link identifier indication method, including: A receiving device receives a radio frame sent by a first link device, where the first multi-link device works on a plurality of links, the radio frame includes link information of at least one link in the plurality of links, and link information of one link is used to indicate the link and corresponds to a link identifier of the link; and the receiving device parses the radio frame, to obtain the link information of the at least one link and a link identifier corresponding to the at least one link. By allocating the link identifier and making the link identifier correspond to the link information, a link supported by the first multi-link device can be indicated by using the link identifier, so that signaling overheads can be reduced and transmission efficiency can be improved.

According to a third aspect, an embodiment provides a transceive capability indication method, including: A first multi-link device generates a radio frame, where the first multi-link device works on N links, and N is an integer greater than 1; and the first multi-link device sends the radio frame, where the radio frame includes a multi-link operating capability list field, the multi-link operating capability list field includes K multi-link operating capability fields, one multi-link operating capability field corresponds to one link in the N links, the multi-link operating capability field is used to indicate whether the corresponding link and another link in the N links support simultaneous transceiving, and K is an integer greater than or equal to 1 and less than or equal to N. One multi-link operating capability field is introduced into the radio frame, and the multi-link operating capability field indicates whether the corresponding link and the another link in the N links support simultaneous transceiving, so that the receiving device can determine simultaneous transceive capabilities of the plurality of links, to improve transmission efficiency.

It should be noted that, "simultaneous transceiving" or "simultaneity" neither means that a starting time point and an ending time point of sent data are strictly the same as those of received data, nor means that a sending time is completely the same as a receiving time. It may be understood that, when there is an intersection set that is not empty in terms of time between duration of data sent on one link and duration of data received on another link, this may also be referred to as "simultaneity".

According to a fourth aspect, an embodiment provides a transceive capability indication method, including: A receiving device receives a radio frame sent by a first multi-link device, where the first multi-link device works on N links, the radio frame includes a multi-link operating capability list field, the multi-link operating capability list field includes K multi-link operating capability fields, one multi-link operating capability field corresponds to one link in the N links, the multi-link operating capability field is used to indicate whether the corresponding link and another link in the N links support simultaneous transceiving, N is an integer greater than 1, and K is an integer greater than or equal to 1 and less than or equal to N; and the receiving device determines, based on the multi-link operating capability field, whether the link corresponding to the multi-link operating capability field and the another link in the N links support simultaneous transceiving.

In a possible design of the third aspect or the fourth aspect, the multi-link operating capability list field includes a capability field quantity field, the capability field quantity field is used to indicate a quantity of the multi-link operating capability fields, and a value of the capability field quantity field is K.

In another possible design of the third aspect or the fourth aspect, that one multi-link operating capability field corresponds to one link in the N links includes: Sequences of the K multi-link operating capability fields sequentially correspond to K links in the N links; and an $i^{th}$ multi-link operating capability field in the K multi-link operating capability fields corresponds to an $i^{th}$ link in the K links, and is used to indicate whether the $i^{th}$ link and another link in the N links support simultaneous transceiving, and i is an integer greater than or equal to 1 and less than or equal to N.

In another possible design of the third aspect or the fourth aspect, one multi-link operating capability field in the K multi-link operating capability fields includes a link identifier of an $i^{th}$ link, and corresponds to the $i^{th}$ link; and the multi-link operating capability field corresponding to the $i^{th}$ link is used to indicate whether the $i^{th}$ link and another link in the N links support simultaneous transceiving, and i is an integer greater than or equal to 1 and less than or equal to N.

In another possible design of the third aspect or the fourth aspect, K=N, the multi-link operating capability field corresponding to the $i^{th}$ link includes a transceive capability indication bitmap, the transceive capability indication bitmap includes N bits, a $j^{th}$ bit in the transceive capability indication bitmap is used to indicate whether the $i^{th}$ link and a $j^{th}$ link in the N links support simultaneous transceiving, and j is an integer greater than or equal to 1 and less than or equal to N.

In another possible design of the third aspect or the fourth aspect, K=N-1, and the multi-link operating capability field corresponding to the $i^{th}$ link includes N-i bits, a $j^{th}$ bit in the N-i bits is used to indicate whether the $i^{th}$ link and an $(i+j)^{th}$ link in the N links support simultaneous transceiving, and j is an integer greater than or equal to 1 and less than or equal to N.

In another possible design of the third aspect or the fourth aspect, that one multi-link operating capability field corresponds to one link includes: Sequences of the K multi-link operating capability fields sequentially correspond to K links in the N links; and an $i^{th}$ multi-link operating capability field in the K multi-link operating capability fields corresponds to an $i^{th}$ link in the K links, and is used to indicate whether the $i^{th}$ link that uses a first bandwidth and another link that uses a second bandwidth in the N links support simultaneous transceiving, and i is an integer greater than or equal to 1 and less than or equal to N.

In another possible design of the third aspect or the fourth aspect, one multi-link operating capability field in the K multi-link operating capability fields includes a link identifier of an $i^{th}$ link, and corresponds to the $i^{th}$ link; and the multi-link operating capability field corresponding to the $i^{th}$ link is used to indicate whether the $i^{th}$ link that uses a first bandwidth and another link that uses a second bandwidth in the N links support simultaneous transceiving, and i is an integer greater than or equal to 1 and less than or equal to N.

In another possible design of the third aspect or the fourth aspect, K=N, and the multi-link operating capability field corresponding to the $i^{th}$ link includes N simultaneous transceive information units, a $j^{th}$ simultaneous transceive information unit in the N simultaneous transceive information units is used to indicate whether the $i^{th}$ link that uses the first bandwidth and a $j^{th}$ link that uses the second bandwidth in the N links support simultaneous transceiving, and j is an integer greater than or equal to 1 and less than or equal to N.

In another possible design of the third aspect or the fourth aspect, K=N-1, and the multi-link operating capability field corresponding to the $i^{th}$ link includes N-i simultaneous transceive information units, a $i^{th}$ simultaneous transceive information unit in the N-i simultaneous transceive information units is used to indicate whether the $i^{th}$ link that uses the first bandwidth and an $(i+j)^{th}$ link that uses the second bandwidth in the N links support simultaneous transceiving, and j is an integer greater than or equal to 1 and less than or equal to N.

In another possible design of the third aspect or the fourth aspect, that one multi-link operating capability field corresponds to one link includes: Sequences of the K multi-link operating capability fields sequentially correspond to K links in the N links; and an $i^{th}$ multi-link operating capability field in the K multi-link operating capability fields corresponds to an $i^{th}$ link in the K links, and is used to indicate a minimum frequency separation that is allowed when the $i^{th}$ link and another link in the N links perform simultaneous transceiving, and i is an integer greater than or equal to 1 and less than or equal to N.

In another possible design of the third aspect or the fourth aspect, one multi-link operating capability field in the K multi-link operating capability fields includes a link identifier of an $i^{th}$ link, and corresponds to the $i^{th}$ link; and the multi-link operating capability field corresponding to the $i^{th}$ link is used to indicate a minimum frequency separation that is allowed when the $i^{th}$ link and another link in the N links perform simultaneous transceiving, and i is an integer greater than or equal to 1 and less than or equal to N.

In another possible design of the third aspect or the fourth aspect, the multi-link operating capability list field includes a common frequency separation subfield, and the common frequency separation subfield is used to indicate a minimum frequency separation that is allowed when two links in the N links perform simultaneous transceiving.

In another possible design of the third aspect or the fourth aspect, K is equal to N, and the multi-link operating capability field corresponding to the $i^{th}$ link includes N frequency separation subfields, and a $j^{th}$ frequency separation subfield in the N frequency separation subfields is used to indicate a minimum frequency separation that is allowed when the $i^{th}$ link and a $j^{th}$ link in the N links perform simultaneous transceiving, and j is an integer greater than or equal to 1 and less than or equal to N.

In another possible design of the third aspect or the fourth aspect, K=N-1, and the multi-link operating capability field corresponding to the $i^{th}$ link includes N-i frequency separation subfields, a $j^{th}$ frequency separation subfield in the N-i frequency separation subfields is used to indicate a minimum frequency separation that is allowed when the $i^{th}$ link and an $(i+j)^{th}$ link in the N links perform simultaneous transceiving, and j is an integer greater than or equal to 1 and less than or equal to N.

In another possible design of the third aspect or the fourth aspect, the multi-link operating capability list field includes a frequency location indication field, and the frequency location indication field is used to indicate that the minimum frequency separation is a minimum value of a distance between center frequencies of two links in the N links or a minimum value of a distance between edge frequencies of the two links.

In another possible design of the third aspect or the fourth aspect, the multi-link operating capability list field includes a transmit power level field, and the transmit power level field is used to indicate a transmit power threshold when two links in the N links support simultaneous transceiving.

In another possible design of the third aspect or the fourth aspect, the multi-link operating capability list field includes N transmit power level fields, one transmit power level field corresponds to one multi-link operating capability field, and the transmit power level field is used to indicate a transmit power threshold when a link corresponding to the multi-link operating capability field and another link support simultaneous transceiving.

According to a fifth aspect, an embodiment provides a first communications apparatus. The first communications apparatus is configured to implement a method and a function performed by the first multi-link device in the first aspect or the third aspect, and the method and function are implemented by hardware/software, and the hardware/software includes modules corresponding to the foregoing function.

According to a sixth aspect, an embodiment provides a second communications apparatus. The second communications apparatus is configured to implement a method and a function performed by the receiving device in the second aspect or the fourth aspect, and the method and function are implemented by hardware/software, and the hardware/software includes modules corresponding to the foregoing function.

According to a seventh aspect, an embodiment provides a first multi-link device, including a processor, a memory, and a communications bus. The communications bus is configured to implement connection and communication between the processor and the memory. The processor executes programs stored in the memory, to implement steps in the first aspect or the third aspect.

In a possible design, the first multi-link device may include a corresponding module configured to perform behavior of the first entity in the foregoing method design. The module may be software and/or hardware.

According to an eighth aspect, an embodiment provides a receiving device, including a processor, a memory, and a communications bus. The communications bus is configured to implement connection and communication between the processor and the memory. The processor executes programs stored in the memory, to implement steps provided in the second aspect or the fourth aspect.

In a possible design, the receiving device may include a corresponding module configured to perform behavior of the first multi-link device in the foregoing method design. The module may be software and/or hardware.

According to a ninth aspect, a computer-readable storage medium stores instructions. When the instructions are run on a computer, the computer is enabled to perform the methods in the foregoing aspects.

According to a tenth aspect, a computer program product includes instructions. When the computer program product runs on a computer, the computer is enabled to perform the methods in the foregoing aspects.

According to an eleventh aspect, a chip is provided. The chip includes a processor configured to invoke, from a memory, instructions stored in the memory and run the instructions, so that a communication device in which the chip is installed performs the method according to any one of the foregoing aspects.

According to a twelfth aspect, an embodiment further provides another chip. The chip may be a chip in a first multi-link device or a receiving device. The chip includes an input interface, an output interface, and a processing circuit. The input interface, the output interface, and the circuit are connected by using an internal connection path. The processing circuit is configured to perform the method in any one of the foregoing aspects.

According to a thirteenth aspect, another chip is provided. The chip includes an input interface, an output interface, and a processor. Optionally, the chip further includes a memory. The input interface, the output interface, the processor, and the memory are connected to each other through an internal connection path. The processor is configured to execute code in the memory. When the code is executed, the processor is configured to perform the method according to any one of the foregoing aspects.

According to a fourteenth aspect, an apparatus is provided. The apparatus is configured to implement the method according to any one of the foregoing aspects.

BRIEF DESCRIPTION OF THE DRAWINGS

To describe technical solutions in embodiments more clearly, the following describes the accompanying drawings for describing embodiments.

DETAILED DESCRIPTION

The following describes embodiments with reference to the accompanying drawings.

Embodiments provide a link identifier indication method and a transceive capability indication method. The method is applied to a wireless communications system. The wireless communications system may be a wireless local area network, and the wireless local area network includes at least one access point (AP) and at least one station (STA). The AP is a network element that provides a service for an STA, and may be referred to as an AP STA, for example, an access point that can support the 802.11 protocols. The STA may support the 802.11 protocols, and may vbe referred to as a non-AP STA, for example, an extremely high throughput (EHT) STA, or an STA that supports IEEE 802.11be.

Figure 1:
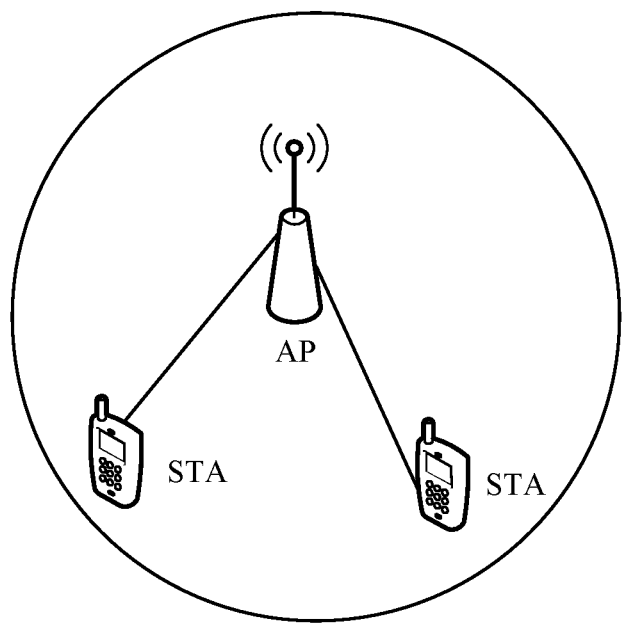
FIG. 1 is a schematic diagram of a structure of a communications system according to an embodiment.

For example, as shown in FIG. 1, the indication method may be applied to a communications system shown in FIG. 1. In the communications system, one access point AP may perform data transmission with a plurality of STAs. For example, the AP in FIG. 1 may transmit uplink data or downlink data with two STAs. The indication methods may be applied to communication between APs, or may be applied to communication between an AP and a STA, or communication between STAs.

Currently, an Institute of Electrical and Electronics Engineers (IEEE) 802.11 next-generation Wi-Fi protocol device can support increasing a peak throughput in manners such as using a plurality of streams, a plurality of bands (for example, 2.4 GHz, 5 GHz, and 6 GHz bands), and through cooperation between a plurality of channels on a same band, to reduce a service transmission delay. In other words, the STA in the communications system shown in FIG. 1 may transmit uplink or downlink data in a multi-band or multi-channel manner. To be specific, the STA may transmit uplink or downlink data through a plurality of links, and the STA that transmits uplink or downlink data through a plurality of links may be referred to as a multi-link STA. A next-generation IEEE 802.11 standard STA that simultaneously supports a plurality of links may be referred to as an ML device, and an internal entity responsible for any link in the ML device is referred to as a STA. An IEEE 802.11 standard STA that supports only one link or an IEEE 802.11 standard STA that works only on one link is referred to as a single link (SL) device. Because only one link is supported, the STA may also be referred to as an SL STA. If the ML device is an AP, the ML device may be further referred to as an ML AP. If the ML device is a non-AP STA, the ML device may be further referred to as an ML non-AP STA.

For example, the STA in the communications system shown in FIG. 1 may be a multi-link STA, and the AP in the communications system shown in FIG. 1 may also be a multi-link AP, that is, an AP that can receive uplink data or send downlink data through a plurality of links. The multi-link STA may include one or more STAs, and the one or more STAs work on a plurality of links. The multi-link AP includes one or more APs, and the one or more APs work on a plurality of links.

Continuously increasing a throughput is a continuous technical goal for development and evolution of a cellular network and the WLAN. The protocol of the WLAN system is mainly discussed in the IEEE 802.11 standard group. In previous standards such as 802.11a/b/g/n/ac/ax, the throughput is continuously increased. The next-generation standard IEEE 802.11be uses multi-link (ML) as one of key technologies to achieve a technical goal of an extremely high throughput. A core idea is that a WLAN device supporting the next-generation IEEE 802.11 standard has a capability of transmitting and receiving on multi-band, so that a larger bandwidth can be used for data transmission, thereby significantly increasing the throughput. Access and transmission performed on each band are referred to as one link, or access and transmission performed on a frequency range on a same band are referred to as one link, so that access and transmission formed by a plurality of links are referred to as ML.

Figure 2:
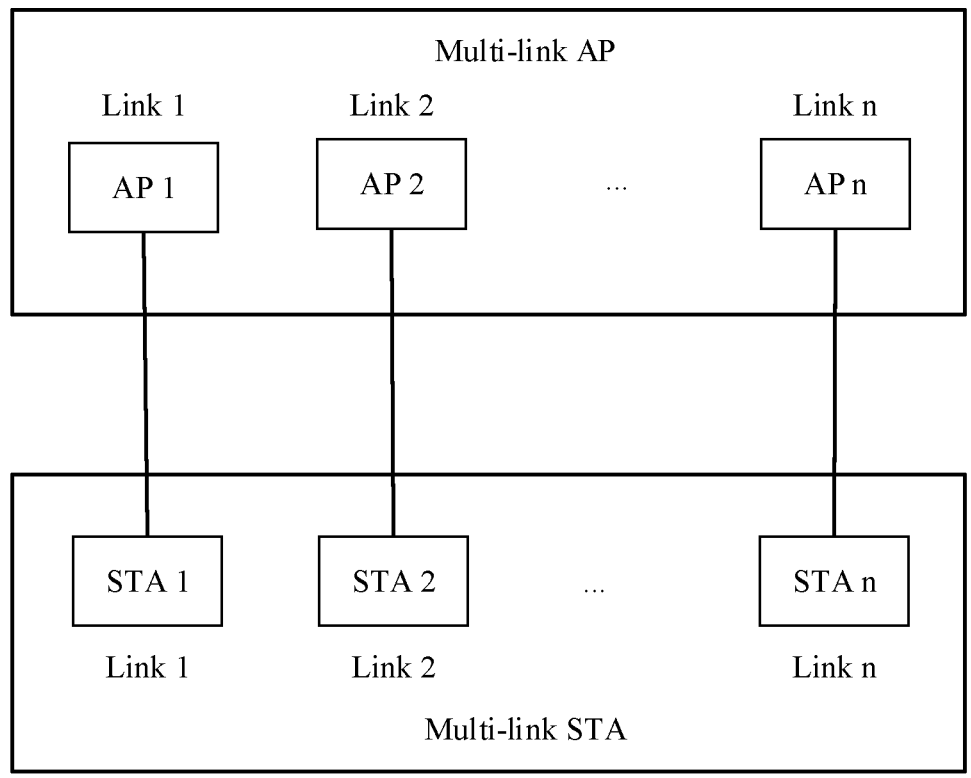
FIG. 2 is a schematic diagram of communication between multi-link devices according to an embodiment.

For example, FIG. 2 is a schematic diagram of communication between multi-link devices, for example, may be a schematic diagram of communication between a multi-link AP and a multi-link STA in the communications system shown in FIG. 1. As shown in FIG. 2, the multi-link STA may communicate with the multi-link AP through two links. The multi-link STA includes a STA 1 and a STA 2, and the multi-link AP includes an AP 1 and an AP 2. The STA 1 in the multi-link STA may communicate with the AP 1 in the multi-link AP through a link 1, and the STA 2 in the multi-link STA may communicate with the AP 2 in the multi-link AP through a link 2. In other words, the multi-link STA may transmit data with the multi-link AP through a plurality of links, and one STA in a plurality of STAs included in the multi-link STA works on one of the plurality of links.

Figure 3:
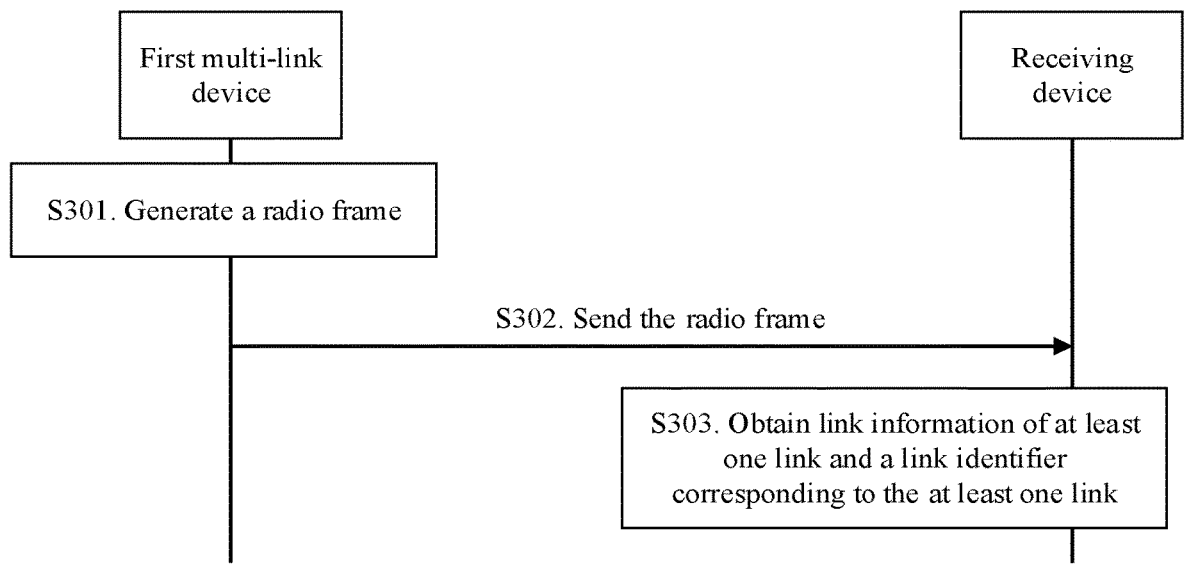
FIG. 3 is a schematic flowchart of a link identifier indication method according to an embodiment.

In a communication process of multi-link devices, links used by both communication parties need to be determined, to implement accurate transceiving, and improve communication efficiency. However, because the multi-link devices work on a relatively large quantity of links, signaling overheads for indicating links are usually relatively high. To resolve the foregoing technical problem, embodiments provide the following solutions. FIG. 3 is a schematic flowchart of a link identifier indication method according to an embodiment. The method includes, but is not limited to, the following steps.

S301: A first multi-link device generates a radio frame, where the first multi-link device works on a plurality of links. The first multi-link device may include one or more STAs, and the one or more STAs work on the plurality of links.

For example, the first multi-link device may be an access point or may be an STA in the communications system shown in FIG. 1.

S302: The first multi-link device sends the radio frame, and a receiving device receives the radio frame, where the radio frame includes link information of at least one link in the plurality of links, and link information of one link is used to indicate the link and corresponds to a link identifier of the link. The link information may include a band identifier (ID) field, an operating class field, and a channel number. The link identifier may also be referred to as a link index value.

S303: The receiving device parses the radio frame, to obtain the link information of the at least one link and a link identifier corresponding to the at least one link. Optionally, the receiving device may be a multi-link device, or may be a single-link device. For example, the receiving device is the STA or the AP in FIG. 1.

In this embodiment, how to indicate the link identifier and the link information to the receiving device may be implemented in a manner of indicating the link identifier explicitly and indicating the link identifier implicitly. Specifically, the following implementations may be included:

In a first manner, the radio frame includes at least one multi-band element, and one multi-band element includes link information of one link and a multi-band control field. The multi-band control field includes a multi-link indexing present field, and the multi-link indexing present field is used to indicate whether a multi-link indexing field exists in the multi-band element; and if the multi-link indexing present field indicates that the multi-link indexing field exists in the multi-band element, the multi-link indexing field includes a link identifier of the link corresponding to the link information. Otherwise, the multi-link indexing field does not exist in the multi-band element. Optionally, the multi-link indexing present field may alternatively not be included.

Figure 4:
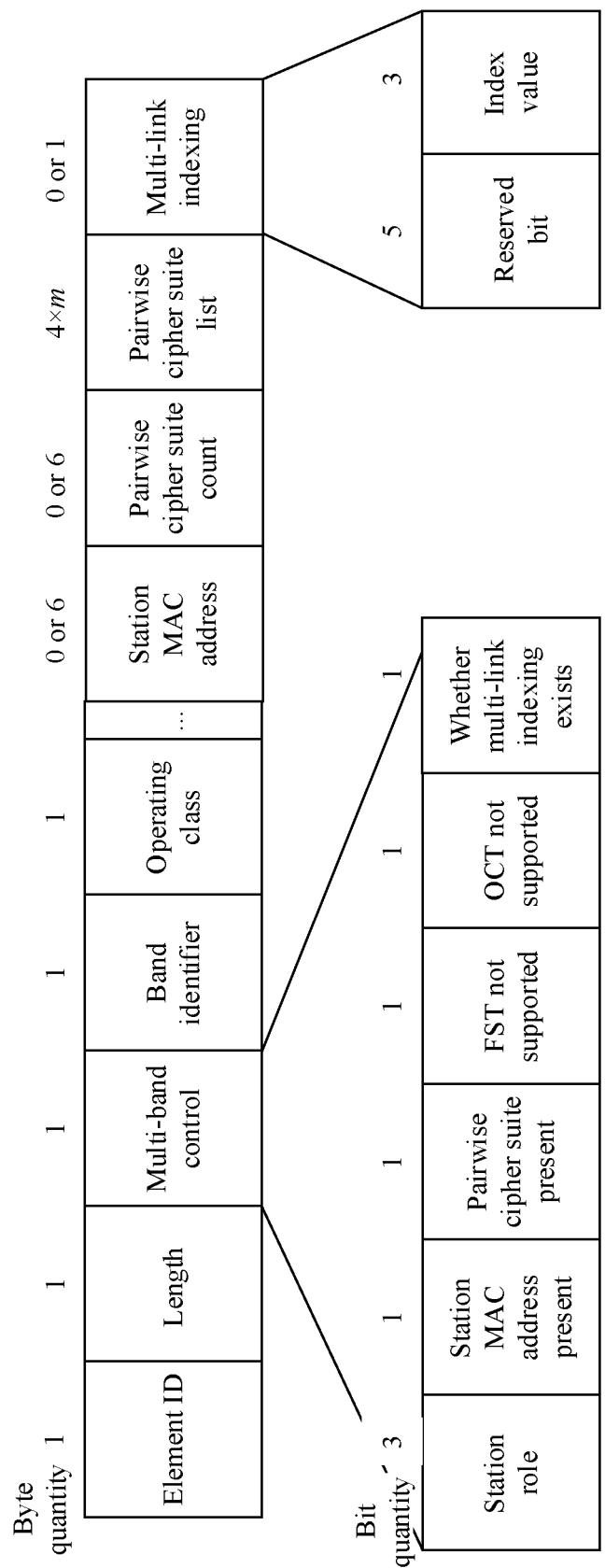
FIG. 4 is a schematic diagram of a multi-band element according to an embodiment.

For example, FIG. 4 is a schematic diagram of a multi-band element according to an embodiment. The multi-band element includes the multi-band control field. An original last bit in the multi-band control field is a reserved bit. In this embodiment, the reserved bit is modified to the multi-link indexing present field. If a value of the multi-link indexing present field is 0, it indicates that the multi-link indexing field does not exist in the multi-band element. If the value of the multi-link indexing present field is 1, it indicates that the multi-link indexing field exists in the multi-band element. A multi-link indexing field is added to the end of an existing multi-band element field of IEEE 802.11. The multi-link indexing field indicates a link identifier of a link indicated by the multi-band element. Certainly, values of the multi-link indexing present field may also be interchanged, and a same meaning is expressed. For another example, as shown in FIG. 4, the multi-band element may further include an element ID field, a length field, a band ID field, an operating class field, an STA medium access control (MAC) address field, a pairwise cipher suite count field, and a pairwise cipher suite list field. The multi-band control field includes an STA role field, an STA MAC address present field, a pairwise cipher suite present field, a fast session transfer not supported field, an on channel tunneling not supported field, and the like. Refer to sizes shown in FIG. 4 for byte quantities and bit quantities of the fields, which are not limited.

In a second manner, the radio frame includes at least one multi-band element, and one multi-band element includes link information of one link and a pairwise cipher suite list field, where the pairwise cipher suite list field includes a suite selector field, and the suite selector field includes a manufacturer identifier subfield and a suite type subfield; and if the manufacturer identifier subfield takes a first value, the suite type subfield includes a link identifier of the link corresponding to the link information. Optionally, the multi-band element may further include a pairwise cipher suite count field, and a value of the pairwise cipher suite count field is equal to an actual quantity of pairwise cipher suites plus 1.

Figure 5:
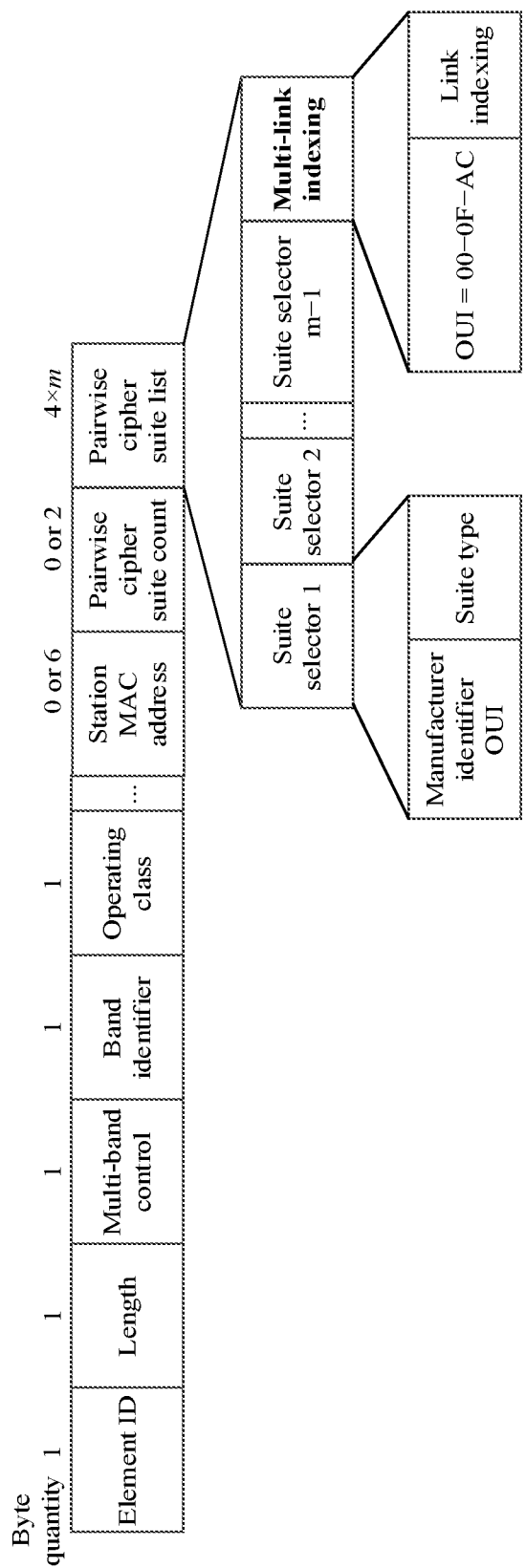
FIG. 5 is a schematic diagram of another multi-band element according to an embodiment.

For example, FIG. 5 is a schematic diagram of another multi-band element according to an embodiment. The multi-band element includes the pairwise cipher suite list field, the pairwise cipher suite list field includes m suite selector fields, and the last suite selector field is multiplexed as a multi-link indexing field. If a link identifier needs to be allocated to a link corresponding to the multi-band element, the value of the pairwise cipher suite count field is equal to the actual quantity of pairwise cipher suites plus 1 (namely, m), and a value of a pairwise cipher suite present field in a multi-band control field is 1.

In addition, each suite selector field includes an organizationally unique identifier (OUI), and the multi-link indexing field may be distinguished from the suite selector field based on the OUI. Specifically, if the OUI is equal to a special value, it indicates that a link identifier field closely follows the OUI; or if the OUI is not a special value, a suite type field closely follows the OUI. For example, the multi-link indexing field includes four bytes. If OUIs of first three bytes of the multi-link indexing field are equal to 00-0F-AC, because values 0 to 13 of the last byte are already used, a value of the last byte may be greater than or equal to 14. In this case, the receiving device may determine, based on that the value of the last byte is greater than or equal to 14, that the link identifier field closely follows the OUI, and determine a value obtained by subtracting 14 or 13 from the value of the last byte as the link identifier. If the value of the last byte is less than 14, it is determined that the suite type field closely follows the OUI. In another example, when the OUIs of the first three bytes of the multi-link indexing field are equal to 00-FF-DD or some other OUI identifiers that are not used, because the values 0 to 13 of the last byte are not used, any value (for example, 1, 2, 3, . . . ) may be used as the link identifier.

For another example, as shown in FIG. 5, the multi-band element may further include an element ID field, a length field, a band ID field, an operating class field, an STA MAC address field, and the like. Refer to sizes shown in FIG. 5 for byte quantities and bit quantities of the fields, which are not limited.

In a third manner, the radio frame includes at least one multi-band element, one multi-band element includes link information of one link, a multi-band control field, and a multi-band connection capability field, the multi-band control field includes a multi-link indexing present field, and the multi-link indexing present field is used to indicate whether a link identifier of the link exists in the multi-band element. If the multi-link indexing present field indicates that the link identifier of the link exists in the multi-band element, a reserved bit in the multi-band connection capability field includes the link identifier of the link corresponding to the link information. Optionally, the multi-band control field may alternatively not include the multi-link indexing present field.

Figure 6:
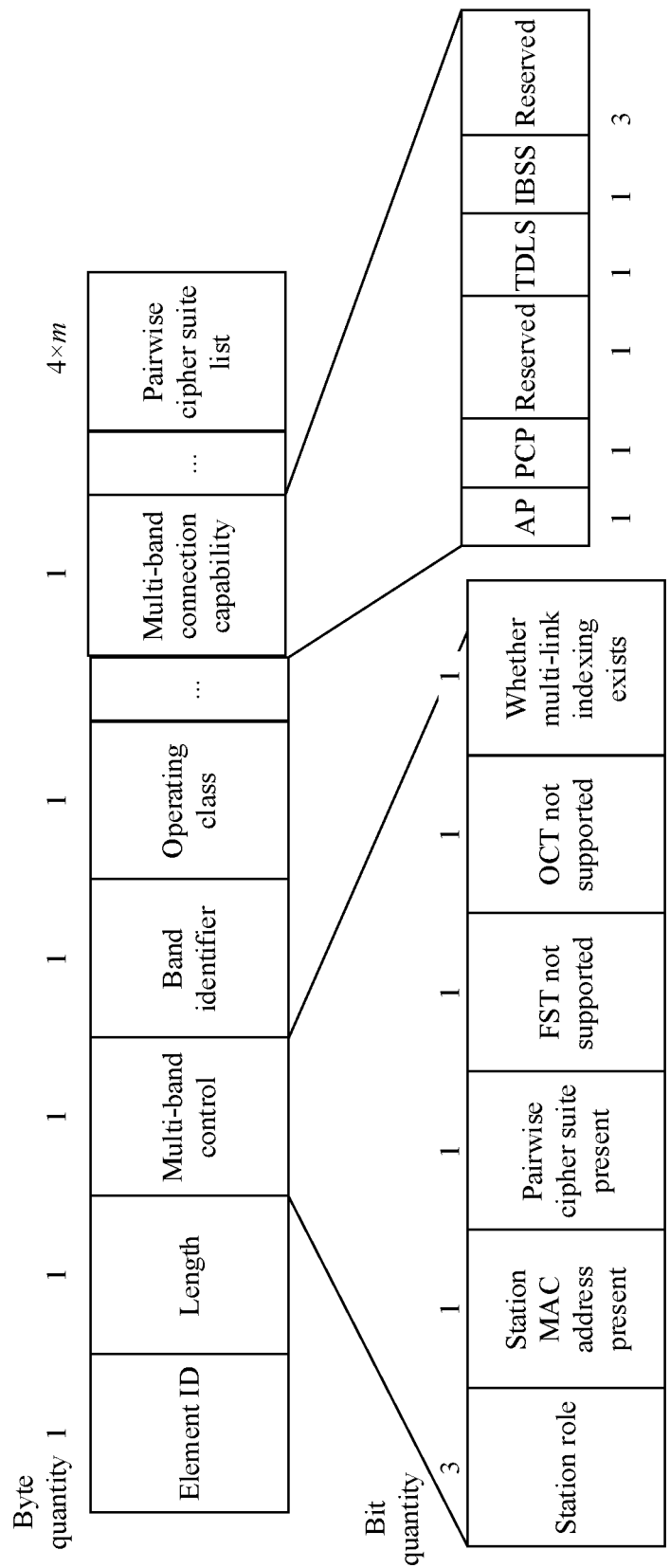
FIG. 6 is a schematic diagram of another multi-band element according to an embodiment.

For example, FIG. 6 is a schematic diagram of another multi-band element according to an embodiment. The multi-band element includes the multi-band control field. An original last bit in the multi-band control field is a reserved bit. In this embodiment, the reserved bit is modified to the multi-link indexing present field. If a value of the multi-link indexing present field is 0, it indicates that the link identifier of the link does not exist in the multi-band element. If the value of the multi-link indexing present field is 1, it indicates that the link identifier of the link exists in the multi-band element. Four reserved bits in the multi-band connection capability field are used to allocate link identifiers, and can support a maximum of 16 links. Certainly, values of the multi-link indexing present field may also be interchanged, and a same meaning is expressed. Bits in the multi-band connection capability field respectively represent an AP, a control point project control plan (PCP), tunneled direct link setup (TDLS), an independent basic service set (IBSS), and the like.

In a fourth manner, the radio frame includes at least one multi-band element, a sequence of the at least one multi-band element is in a one-to-one correspondence with a link identifier of a link corresponding to the at least one multi-band element, one multi-band element includes link information of one link, and a sequence of the multi-band element in the at least one multi-band element indicates a link identifier of the link corresponding to the multi-band element.

For example, as shown in Table 1, this implementation is implicit link index value assignment. A plurality of multi-band element fields exist in a probe request frame, a probe response frame, a beacon frame, or the like of IEEE 802.11, and each multi-band element field represents one link. An appearance sequence of the multi-band element field in the radio frame represents the link identifier of the link indicated by the multi-band element field. For example, an appearance sequence of the first multi-band element in the radio frame is 1, and therefore the link identifier of the first multi-band element may be 1; an appearance sequence of the second multi-band element in the radio frame is 2, and therefore the link identifier of the first multi-band element may be 2, . . . , and an appearance sequence of an $n^{th}$ multi-band element in the radio frame is n, and therefore the link identifier of the $n^{th}$ multi-band element may be n. Optionally, the link identifiers may alternatively start from 0, and the link identifiers of the first multi-band element to the $n^{th}$ multi-band element are respectively 0, 2, . . . , n-1. The link identifiers may alternatively be arranged in a reverse order. The link identifiers of the first multi-band element to the $n^{th}$ multi-band element are respectively n-1, n-2, . . . , 1, 0.

TABLE 1

| Information |
| --- |
| ... |
| First multi-band element |
| Second multi-band element |
| ... |
| $n^{th}$ multi-band element |

In a fifth manner, the radio frame includes at least one multi-band element and a multi-link indexing allocation field, the multi-link indexing allocation field includes a link identifier of the at least one link, one multi-band element includes link information of one link, and one link identifier corresponds to one multi-band element.

For example, as shown in Table 2, a multi-link indexing action frame is newly introduced into IEEE 802.11. A category field in the radio frame is consistent with a manner of existing IEEE 802.11. A plurality of multi-band element fields closely follow the category field. Each multi-band element field corresponds to one link. A multi-link indexing allocation field exists at the end of the radio frame. The multi-link indexing allocation field is used to sequentially allocate link identifiers to links corresponding to the plurality of multi-band element fields in the radio frame based on a sequence. The multi-link indexing allocation field includes a plurality of multi-link index value fields, and a quantity of the multi-link index value fields is equal to a quantity of the multi-band element fields. A value of an $i^{th}$ multi-link index value field represents a link identifier of a link corresponding to an $i^{th}$ multi-band element field.

TABLE 2

| Sequence | Information |
| --- | --- |
| 1 | Category |
| 2 | Multi-band |
| 3 | Multi-band |
| ... | ... |
| XX | Multi-link indexing allocation |

The foregoing radio frame may be a probe request frame, a probe response frame, a beacon frame, or the like.

It should be noted that, the link identifiers may be allocated by the AP. The AP may send the radio frame carrying the link identifiers to the STA. The radio frame may be a beacon frame, a probe response frame, an association response frame, an authentication response, or a reassociation response frame. After receiving the radio frame sent by the AP, the STA may determine link identifiers of links supported by the STA. Optionally, the links supported by the STA are all a subset of links supported by the AP.

Optionally, the link identifiers may alternatively be allocated by the STA, and each STA associated with the AP may separately allocate the link identifiers. For example, a STA 1 supports three links, and the link identifiers are respectively 1, 2, and 3; and a STA 2 supports four links, and the link identifiers are respectively 1, 2, 3, and 4. The STA may send the radio frame carrying the link identifiers to the AP. The radio frame may be a probe request frame, an authentication response, an association request frame, or a reassociation request frame. After receiving the radio frame sent by the STA, the AP may determine the link identifiers of the links supported by the STA. Because the STA 11 may allocate an identifier 1 to a link 1, and the STA 2 may allocate the identifier 1 to a link 2, to prevent the AP from confusing with the links corresponding to the identifier 1, the link identifiers need to be bound to an address of the STA. After receiving the radio frame sent by the STA, the AP may determine the link identifiers of the links supported by each STA based on the link identifiers and the address of the STA. Optionally, the address of the STA may be a MAC address or an association identifier AID of the STA.

The link identifiers may be allocated to the links in the foregoing optional manners, or may be allocated in another manner. The following describes how to use the foregoing allocated link identifiers.

The first multi-link device sends a multi-link indexing element, and the receiving device may receive the multi-link indexing element sent by the first multi-link device. The multi-link indexing element includes a multi-link indexing information (MLI info) field, the MLI info field includes a link identifier or a bitmap of a link selected from the plurality of links, and the bitmap is used to indicate whether a link in the plurality of links is selected.

Figure 7:
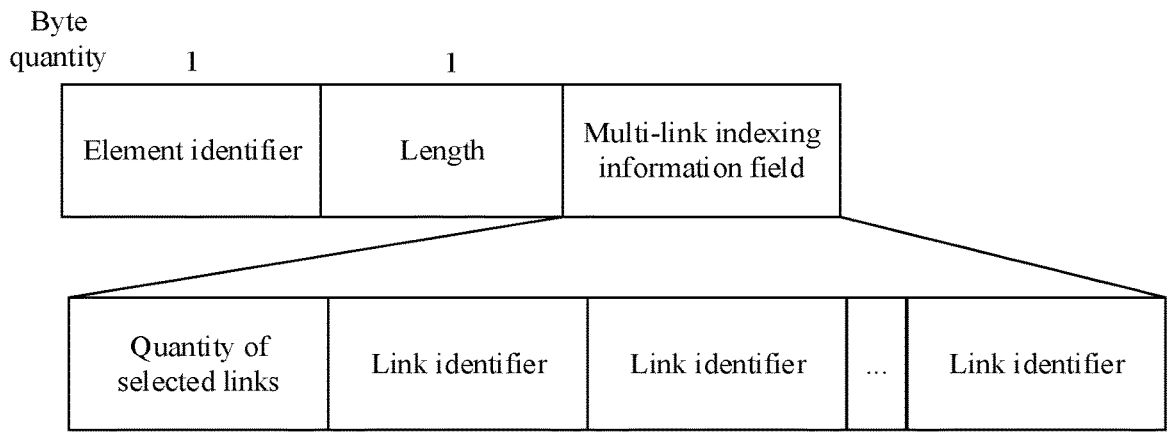
FIG. 7 is a schematic diagram of a multi-link indexing element according to an embodiment.

For example, FIG. 7 is a schematic diagram of a multi-link indexing element according to an embodiment. The multi-link indexing element is an explicit implementation. A new element is introduced into IEEE 802.11, and is referred to as a multi-link indexing element. The multi-link indexing element includes an element identifier field, a length field, and an MLI info field. The MLI info field includes a selected link quantity field and a plurality of link identifier fields. A quantity of the link identifier fields is equal to a value of the selected link quantity field. A link corresponding to each link identifier is selected.

Figure 8:
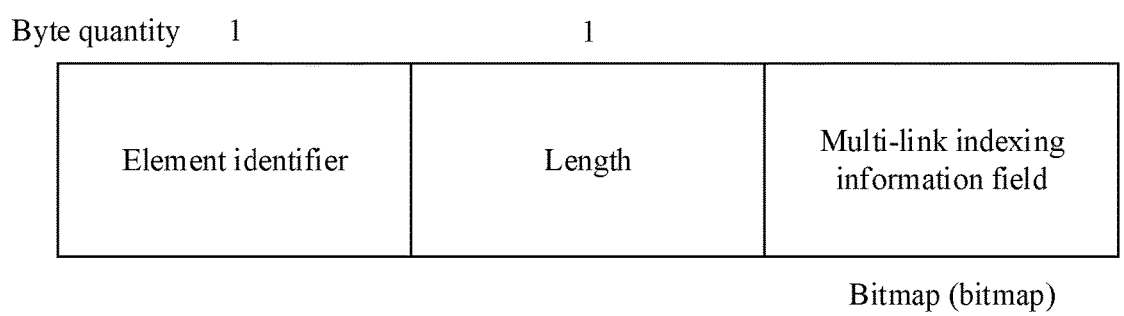
FIG. 8 is a schematic diagram of another multi-link indexing element according to an embodiment.

For another example, FIG. 8 is a schematic diagram of another multi-link indexing element according to an embodiment. The multi-link indexing element is an implicit implementation. A new element is introduced into IEEE 802.11, and is referred to as a multi-link indexing element. The element includes an element identifier field, a length field, and an MLI info field. The multi-link indexing information field is in a form of a bitmap, and a bit i represents whether a link whose link identifier is i is selected. For example, a value 1 of the $i^{th}$ bit in the bitmap represents that the link corresponding to the link identifier i is selected, and a value 0 of the $i^{th}$ bit in the bitmap represents that the link corresponding to the link identifier i is not selected. Certainly, the value 0 may represent that the link is selected, and the value 1 may represent that the link is not selected. i is an integer greater than or equal to 0.

The multi-link indexing element may be carried in an add block acknowledgement (ADDBA) communications mechanism request frame and an ADDBA response frame, to support establishment of multi-link BA. A multi-link indexing element may be added to the end of a frame structure of an existing ADDBA request frame or ADDBA response frame. Selected links in the multi-link indexing element of the ADDBA request frame are links on which a sending party expects to establish BA, and selected links in the multi-link indexing element of the ADDBA response frame are a subset of the selected links in the multi-link indexing element of the ADDBA request frame. A receiving party confirms with the sending party that BA is established on the selected links.

Optionally, the multi-link indexing element may alternatively be carried in an association request frame and an association response frame, to support multi-link selection. A multi-link indexing element may be added to the end of a frame structure of an existing association request frame or association response frame. Selected links in the multi-link indexing element of the association request frame are links on which a sending party expects to communicate with the receiving party, and selected links in the multi-link indexing element of the association response frame are a subset of the selected links in the multi-link indexing element of the association request frame. The receiving party confirms with the sending party that both parties communicate on the links.

In this embodiment, by allocating the link identifiers and making the link identifiers correspond to the link information, links can be indicated by using the link identifiers. For example, a BA connection is established by using the link identifiers, or communication is established by using the link identifiers, so that signaling overheads can be reduced and transmission efficiency can be improved.

When a frequency separation between a plurality of bands supported by a WLAN device supporting a next-generation standard is relatively small, for a same ML STA, if signal sending on one band affects signal receiving on another band and makes it difficult for normal receiving on the another band, or impact of signal sending on one band on signal receiving on another band is greater than a particular threshold, it is considered that multi-link does not have a simultaneous transceive capability. Otherwise, if signal sending on one band does not affect normal signal receiving on another band, or impact of signal sending on one band on normal receiving on another band is less than a particular threshold, it is considered that multi-link has a simultaneous transceive capability. Whether the multi-link has the simultaneous transceive capability is related not only to a distance between two bands, but also to an interference cancellation capability of each ML STA device. Different devices may have different simultaneous transceive capabilities. Because simultaneous transceive capabilities of the multi-link in an ML system are different, as a result, transmission methods are also different. Therefore, to enable the device in the WLAN to select proper links for simultaneous transceiving, and improve transmission efficiency, in a solution, the ML STA may announce whether a plurality of links have the simultaneous transceive capability, so that a receiving party and a sending party can select links that support simultaneous transceiving to perform simultaneous transceiving, thereby improving transmission efficiency. Because there are many factors that affect the multi-link simultaneous transceive capability, for example, a used bandwidth and transmit power, it is incomplete to only simply indicate whether there is the multi-link simultaneous transceive capability. A specific indication of the multi-link simultaneous transceive capability is not provided, affecting data transmission efficiency. To resolve the foregoing technical problem, embodiments provide the following solutions.

Figure 9:
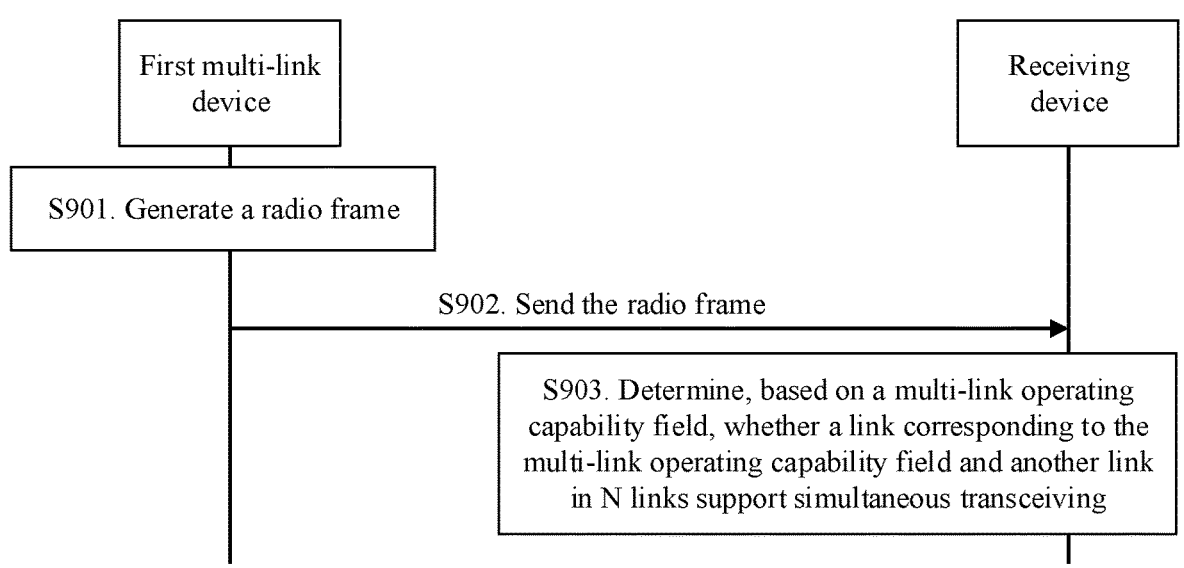
FIG. 9 is a schematic flowchart of a transceive capability indication method according to an embodiment.

FIG. 9 is a schematic flowchart of a transceive capability indication method according to an embodiment. The method includes but is not limited to the following steps.

S901: A first multi-link device generates a radio frame, where the first multi-link device works on N links, the first multi-link device may include one or more stations, the one or more stations work on a plurality of links, the N links are some or all links of the plurality of the links, and N is an integer greater than 1.

The first multi-link device may be a multi-link AP or a multi-link STA, for example, the AP or the STA in FIG. 1.

S902: The first multi-link device sends the radio frame, where the radio frame includes a multi-link operating capability list field, the multi-link operating capability list field includes K multi-link operating capability fields, one multi-link operating capability field corresponds to one link in the N links, the multi-link operating capability field is used to indicate whether the corresponding link and another link in the N links support simultaneous transceiving, and K is an integer greater than or equal to 1 and less than or equal to N.

It should be noted that, "simultaneous transceiving" or "simultaneity" in this embodiment neither means that a starting time point and an ending time point of sent data are strictly the same as those of received data, nor means that a sending time is completely the same as a receiving time. It may be understood that, when there is an intersection set that is not empty in terms of time between duration of data sent on one link and duration of data received on another link, this may also be referred to as "simultaneity".

It should be noted that, in this embodiment, that an $i^{th}$ link and a $j^{th}$ link perform simultaneous transceiving includes: In a first case, the $i^{th}$ link performs sending, and the $j^{th}$ link performs receiving; and in a second case, the $j^{th}$ link performs sending and the $i^{th}$ link performs receiving. In this embodiment, whether simultaneous transceiving is supported in the two cases may be separately indicated, or the two cases may not be distinguished.

S903: The receiving device determines, based on the multi-link operating capability field, whether the link corresponding to the multi-link operating capability field and the another link in the N links support simultaneous transceiving. Optionally, the receiving device is a multi-link device or a single-link device, for example, the STA or the AP in FIG. 1.

Specifically, the radio frame may carry a multi-link operating capability indication element. Optionally, the multi-link operating capability indication element includes an element ID field, a length field, an MLO capability list field, and the like. A simultaneous transceive capability of the plurality of links is indicated by using the multi-link operating capability indication element. When the first multi-link device is the AP, the radio frame may be a beacon frame, a probe response frame, an association response frame, an authentication frame, or a reassociation response frame. When the first multi-link device is the STA, the radio frame may be a probe request frame, an authentication frame, an association request frame, or a reassociation request frame.

TABLE 3

| Information |
|---|
| Multi-band element 1 |
| . . . |
| Multi-band element N |
| Multi-link operating capability |

For example, as shown in Table 3, a plurality of multi-band elements and one multi-link operating capability indication element may be added to an element list of an existing probe response frame and probe request frame of IEEE 802.11. Each multi-band element corresponds to one link. The multi-link operating capability indication element is used to indicate the simultaneous transceive capability of the plurality of links. A sequence of links corresponding to the plurality of multi-link operating capability fields in the multi-link operating capability indication element remains consistent with an appearance sequence of the multi-band element fields.

TABLE 4

| Information Category |
| --- |
| Multi-band element 1 |
| Multi-band element 2 |
| . . . |
| Multi-band element N |
| Multi-link operating capability |

For another example, as shown in Table 4, an MLO capability announcement action frame may be introduced. The multi-link capability announcement action frame is used to indicate a multi-link operating capability of the first multi-link device. The multi-link capability announcement action frame includes a category element, one or more multi-band elements, and one multi-link operating capability indication element. Each multi-band element corresponds to one link. The multi-link operating capability indication element is used to indicate the simultaneous transceive capability of the plurality of links. A sequence of links corresponding to the plurality of multi-link operating capability fields in the multi-link operating capability indication element remains consistent with an appearance sequence of the multi-band element fields.

This embodiment provides a plurality of methods for indicating whether a plurality of links support simultaneous transceiving, including but not limited to:

Optionally, that one multi-link operating capability field corresponds to one link in the N links includes: Sequences of the K multi-link operating capability fields sequentially correspond to K links in the N links; and an $i^{th}$ multi-link operating capability field in the K multi-link operating capability fields corresponds to an $i^{th}$ link in the K links, and is used to indicate whether the $i^{th}$ link and another link in the K links support simultaneous transceiving, and i is an integer greater than or equal to 1 and less than or equal to N. This manner is an implicit indication manner. The following several optional manners are included.

In a first optional manner, K=N, and it indicates that N multi-link operating capability fields exist, the multi-link operating capability field corresponding to the $i^{th}$ link includes a transceive capability indication bitmap, the transceive capability indication bitmap includes N bits, a $j^{th}$ bit in the transceive capability indication bitmap is used to indicate whether the $i^{th}$ link and a $j^{th}$ link in the N links support simultaneous transceiving, and j is an integer greater than or equal to 1 and less than or equal to N. If the bit is set to 1, it indicates that simultaneous transceiving is supported; or if the bit is set to 0, it indicates that simultaneous transceiving is not supported. 0 or 1 may alternatively indicate an opposite meaning. If the bit is set to 0, it indicates that simultaneous transceiving is supported; or if the bit is set to 1, it indicates that simultaneous transceiving is not supported. Optionally, the transceive capability indication bitmap may include bits with a quantity of all links of the first multi-link device, and the $j^{th}$ bit is used to indicate whether the $i^{th}$ link and the $j^{th}$ link in all the links support simultaneous transceiving. Optionally, the MLO capability list may further include a capability field quantity field, which is used to indicate a quantity of MLO capability fields.

Figure 10:
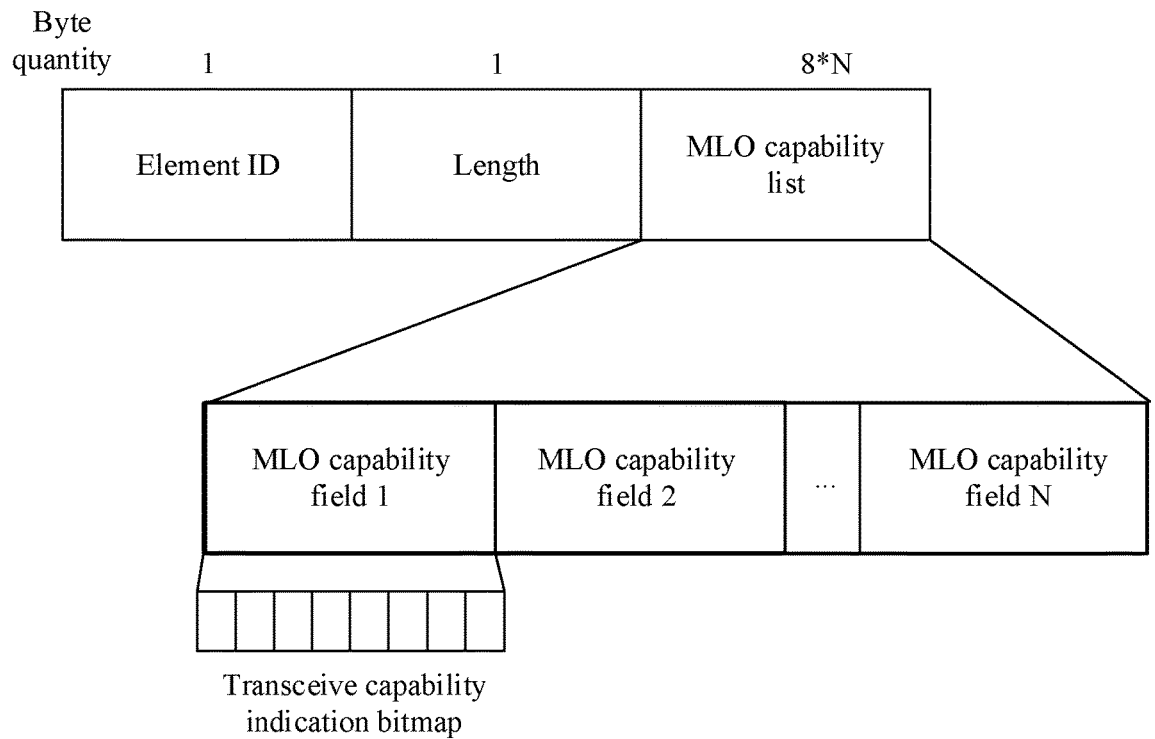
FIG. 10 is a schematic diagram of a structure of a multi-link operating capability indication element according to an embodiment.

It should be noted that, in this embodiment, that an $i^{th}$ link and a $j^{th}$ link perform simultaneous transceiving includes: In a first case, the $i^{th}$ link performs sending, and the $j^{th}$ link performs receiving; and in a second case, the $j^{th}$ link performs sending and the $i^{th}$ link performs receiving. In the first optional manner, whether simultaneous transceiving is supported in the two cases may be separately indicated, or the two cases may not be distinguished. For example, FIG. 10 is a schematic diagram of a structure of a multi-link operating capability indication element according to an embodiment. The multi-link operating capability indication element includes an element identifier field, a length field, an MLO capability list field, and the like. The MLO capability list field includes N MLO capability fields with fixed lengths, and N is a fixed value, for example, N=8. An $i^{th}$ MLO capability field is used to indicate whether sending of an $i^{th}$ link corresponding to the MLO capability field affects receiving of another link. Each MLO capability field includes a transceive capability indication bitmap. A length of the transceive capability indication bitmap may be equal to N, or may be equal to a quantity of all the links supported by the first multi-link device. For the $i^{th}$ MLO capability field, a $j^{th}$ bit represents whether sending of the $i^{th}$ link and receiving of the $j^{th}$ link can be performed simultaneously. If the bit is set to 1, it indicates that the sending of the $i^{th}$ link and the receiving of the $j^{th}$ link can be performed simultaneously; or if the bit is set to 0, it indicates that the sending of the $i^{th}$ link and the receiving of the $j^{th}$ link cannot be performed simultaneously. 0 or 1 may alternatively indicate an opposite meaning. Details are not described herein again. Based on the MLO capability field, the receiving device may determine whether the sending of the $i^{th}$ link and the receiving of the $j^{th}$ link can be performed simultaneously.

In a second optional manner, the multi-link operating capability list field includes a capability field quantity field, the capability field quantity field is used to indicate a quantity of the multi-link operating capability fields, and a value of the capability field quantity field is K.

Figure 11:
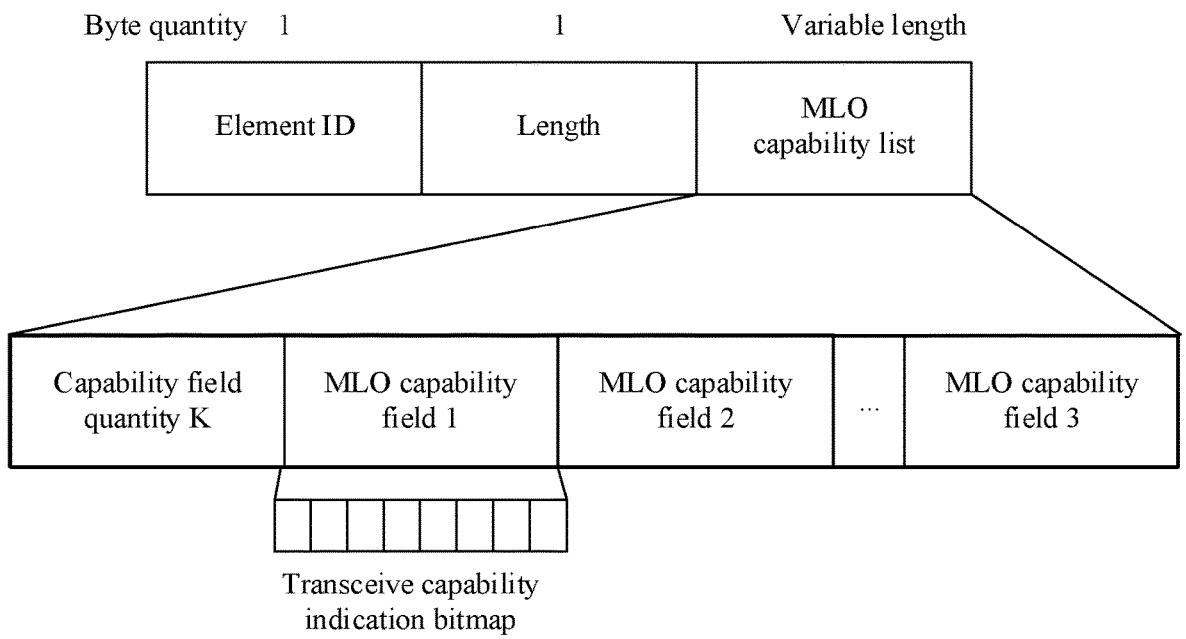
FIG. 11 is a schematic diagram of a structure of another multi-link operating capability indication element according to an embodiment.

For example, FIG. 11 is a schematic diagram of a structure of a multi-link operating capability indication element according to an embodiment. The multi-link operating capability indication element includes an element ID field, a length field, an MLO capability list field, and the like. An $i^{th}$ MLO capability field corresponds to the $i^{th}$ link. A length of the MLO capability list field is variable. The first byte of the MLO capability list field includes a capability field quantity field, and the capability field quantity field represents a quantity of MLO capability fields included in the MLO capability list field. One or more MLO capability fields closely follow the capability field quantity field. Content of the MLO capability field is the same as content shown in FIG. 10. Details are not described herein again.

In a third optional manner, optionally, the multi-link operating capability list field includes a capability field quantity field, and a value K of the capability field quantity field is N-1, and it indicates that N-1 multi-link operating capability fields exist. The multi-link operating capability field corresponding to the $i^{th}$ link includes N-i bits, a $j^{th}$ bit in the N-i bits is used to indicate whether the $i^{th}$ link and an $(i+j)^{th}$ link in the N links support simultaneous transceiving, and j is an integer greater than or equal to 1 and less than or equal to N. Optionally, the multi-link operating capability field corresponding to the $i^{th}$ link may alternatively include bits with a quantity of all the links of the first multi-link device minus i. The $j^{th}$ bit is used to indicate whether the $i^{th}$ link and an $(i+j)^{th}$ link in all the links support simultaneous transceiving. Optionally, in the third optional manner, the following two cases may not be distinguished for simultaneous transceiving indicated by the $j^{th}$ bit: The $i^{th}$ link performs sending, and the $j^{th}$ link performs receiving; and the $j^{th}$ link performs sending and the $i^{th}$ link performs receiving. In other words, the simultaneous transceiving indicated by the $j^{th}$ bit includes: The $i^{th}$ link performs sending, and the $j^{th}$ link performs receiving; and the $j^{th}$ link performs sending and the $i^{th}$ link performs receiving.

Figure 12:
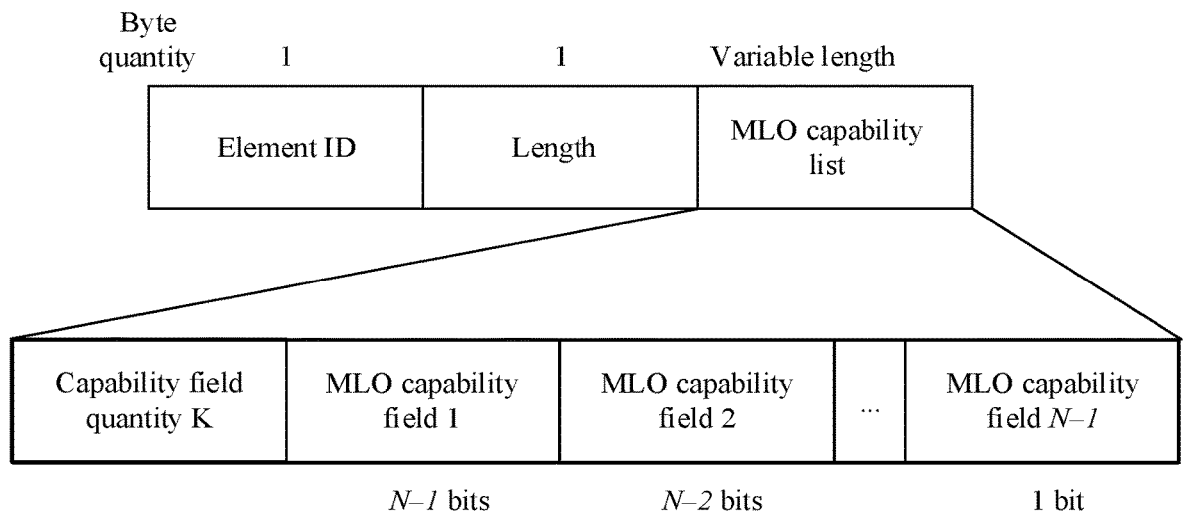
FIG. 12 is a schematic diagram of a structure of another multi-link operating capability indication element according to an embodiment.

For example, FIG. 12 is a schematic diagram of a structure of a multi-link operating capability indication element according to an embodiment. The multi-link operating capability indication element includes an element ID field, a length field, an MLO capability list field, and the like. An $i^{th}$ MLO capability field corresponds to the $i^{th}$ link. A length of the MLO capability list field is variable. The first byte of the MLO capability list field includes a capability field quantity field, and a value K of the capability field quantity field is equal to N-1, and it indicates that N-1 multi-link operating capability fields exist. Quantities of bits of transceive capability indication bitmaps included in the N-1 MLO capability fields decrease progressively in sequence. To be specific, a transceive capability indication bitmap of an $i^{th}$ MLO capability field includes N-i bits. A $j^{th}$ bit in the N-i bits represents whether the $i^{th}$ link and an $(i+j)^{th}$ link support simultaneous transceiving. For example, if the bit is set to 1, it indicates that the $i^{th}$ link and the $(i+j)^{th}$ link support simultaneous transceiving; or if the bit is set to 0, it indicates that the $i^{th}$ link and the $(i+j)^{th}$ link do not support simultaneous transceiving. Certainly, if the bit is set to 1, it may indicate that simultaneous transceiving is not supported; or if the bit is set to 0, it may indicate that simultaneous transceiving is supported. Because the quantities of bits of the transceive capability indication bitmaps decrease progressively in sequence, signaling overheads can be reduced.

Optionally, one multi-link operating capability field in the K multi-link operating capability fields includes a link identifier of an $i^{th}$ link, and corresponds to the $i^{th}$ link; and the multi-link operating capability field corresponding to the $i^{th}$ link is used to indicate whether the $i^{th}$ link and another link in the N links support simultaneous transceiving, and i is an integer greater than or equal to 1 and less than or equal to N. This manner is an explicit indication manner. The multi-link device and the receiving device may negotiate the link identifiers of the links by using the solution of the previous embodiment. Details are not described herein again. The following several optional manners are included.

In a first optional manner, a quantity K of the multi-link operating capability fields is N, the multi-link operating capability field corresponding to the $i^{th}$ link includes a transceive capability indication bitmap and a link identifier field, and the link identifier field is used to indicate a link corresponding to the multi-link operating capability field. The transceive capability indication bitmap includes N bits, a $j^{th}$ bit in the transceive capability indication bitmap is used to indicate whether the $i^{th}$ link and a $j^{th}$ link in the N links support simultaneous transceiving, and j is an integer greater than or equal to 1 and less than or equal to N. Optionally, the transceive capability indication bitmap may include bits with a quantity of all links supported by the first multi-link device, and the $j^{th}$ bit is used to indicate whether the $i^{th}$ link and the $j^{th}$ link in all the links support simultaneous transceiving.

In the first optional manner, two cases of the simultaneous transceiving: the $i^{th}$ link performs sending, and the $j^{th}$ link performs receiving; and the $j^{th}$ link performs sending and the $i^{th}$ link performs receiving, can be separately indicated. For example, the $j^{th}$ bit in the multi-link operating capability field of the $i^{th}$ link indicates whether sending of the $i^{th}$ link and receiving of the $j^{th}$ link can be performed simultaneously, and the $i^{th}$ bit in the multi-link operating capability field of the $j^{th}$ link indicates whether sending of the $j^{th}$ link and receiving of the $i^{th}$ link can be performed simultaneously.

Figure 13:
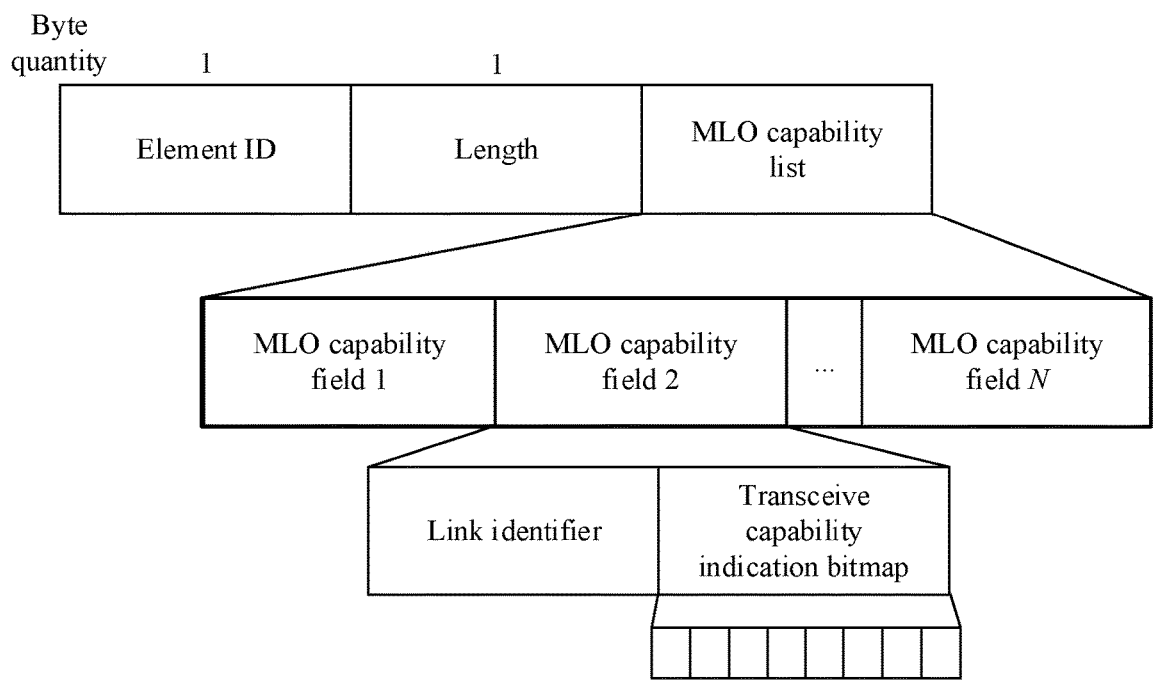
FIG. 13 is a schematic diagram of a structure of another multi-link operating capability indication element according to an embodiment.

For example, FIG. 13 is a schematic diagram of a structure of a multi-link operating capability indication element according to an embodiment. The multi-link operating capability indication element includes an element identifier field, a length field, an MLO capability list field, and the like. The MLO capability list field includes N MLO capability fields with fixed lengths, and N is a fixed value, for example, N=8. An MLO capability field i indicates whether sending of the $i^{th}$ link affects receiving of another link. Each MLO capability field includes a link ID field and a transceive (TX/RX) capability indication bitmap field. For any MLO capability field, the link identifier field represents an ID of a link indicated by the link identifier. A $j^{th}$ bit in the transceive capability indication bitmap field represents whether sending of the link corresponding to the link ID affects receiving of the $j^{th}$ link. If the bit is set to 1, it indicates that the sending of the $i^{th}$ link and the receiving of the $j^{th}$ link can be performed simultaneously; or if the bit is set to 0, it indicates that the sending of the $i^{th}$ link and the receiving of the $j^{th}$ link cannot be performed simultaneously. 0 or 1 may alternatively indicate an opposite meaning. Details are not described herein again.

In a second optional manner, the multi-link operating capability list field includes a capability field quantity field, the capability field quantity field is used to indicate a quantity of the multi-link operating capability fields, and a value of the capability field quantity field is N.

Figure 14:
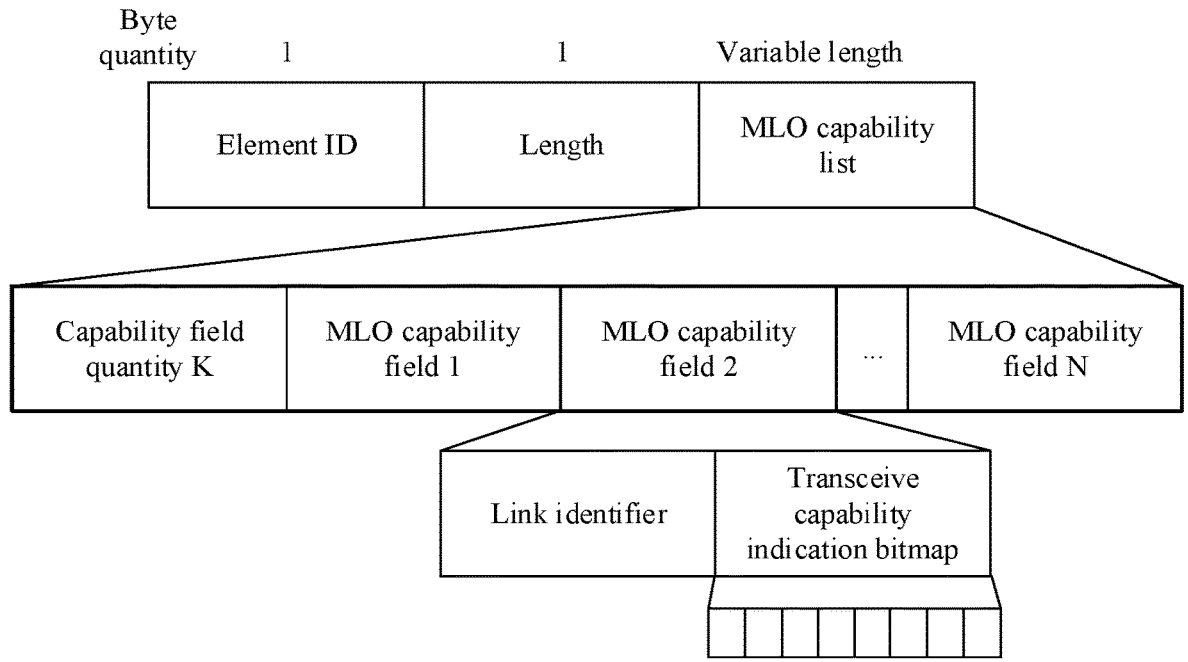
FIG. 14 is a schematic diagram of a structure of another multi-link operating capability indication element according to an embodiment.

For example, FIG. 14 is a schematic diagram of a structure of a multi-link operating capability indication element according to an embodiment. A length of the MLO capability list field is variable. A starting location of the MLO capability list field is a capability field quantity field, which represents a quantity of MLO capability fields included in the MLO capability list field. One or more MLO capability fields closely follow the capability field quantity field. Content of the MLO capability field is the same as content shown in FIG. 13. Details are not described herein again.

In a third optional manner, optionally, the multi-link operating capability list field includes a capability field quantity field, and a value K of the capability field quantity field is N-1, and it indicates that N-1 multi-link operating capability fields exist. The multi-link operating capability field corresponding to the $i^{th}$ link includes N-i bits and a link identifier field, and the link identifier field is used to indicate a link corresponding to the multi-link operating capability field. A $i^{th}$ bit in the N-i bits is used to indicate whether the $i^{th}$ link and an $(i+j)^{th}$ link in the N links support simultaneous transceiving, and j is an integer greater than or equal to 1 and less than or equal to N. Optionally, the multi-link operating capability field corresponding to the $i^{th}$ link may alternatively include bits with a quantity of all the links of the first multi-link device minus i. The $j^{th}$ bit is used to indicate whether the $i^{th}$ link and an $(i+j)^{th}$ link in all the links support simultaneous transceiving.

Figure 15:
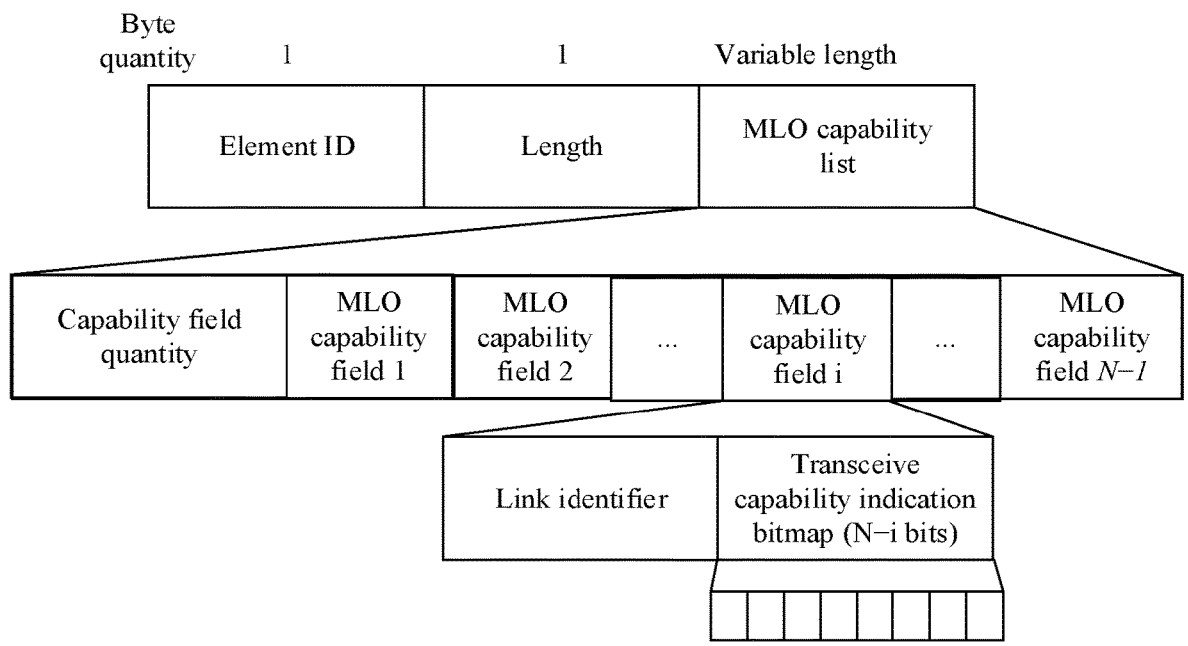
FIG. 15 is a schematic diagram of a structure of another multi-link operating capability indication element according to an embodiment.

For example, FIG. 15 is a schematic diagram of a structure of a multi-link operating capability indication element according to an embodiment. The multi-link operating capability indication element includes an element ID field, a length field, an MLO capability list field, and the like. A length of the MLO capability list field is variable. The first byte of the MLO capability list field includes a capability field quantity field, and a value K of the capability field quantity field is equal to N-1, and it indicates that N-1 multi-link operating capability fields exist. Each multi-link operating capability field includes a link identifier and a transceive capability indication bitmap, and the link identifier is used to indicate a link corresponding to the multi-link operating capability field. Quantities of bits of transceive capability indication bitmaps in the N-1 MLO capability fields decrease progressively in sequence. To be specific, a transceive capability indication bitmap of an $i^{th}$ MLO capability field includes N-i bits. A $i^{th}$ bit in the N-i bits represents whether the $i^{th}$ link and an $(i+j)^{th}$ link support simultaneous transceiving. For example, if the bit is set to 1, it indicates that the $i^{th}$ link and the $(i+j)^{th}$ link support simultaneous transceiving; or if the bit is set to 0, it indicates that the $i^{th}$ link and the $(i+j)^{th}$ link do not support simultaneous transceiving. 0 or 1 may alternatively indicate an opposite meaning. Details are not described herein again. Because the quantities of bits of the transceive capability indication bitmaps decrease progressively in sequence, signaling overheads can be reduced.

In wireless communication, factors affecting the simultaneous transceive capability include a bandwidth, a frequency separation, power, and the like. In this embodiment, the following describes, by separately considering the factors: the bandwidth, the frequency separation, and the power, solutions for indicating the simultaneous transceive capability.

The following describes an implementation of the multi-link operating capability indication element when the bandwidth factor is considered.

That one multi-link operating capability field corresponds to one link includes: Sequences of the K multi-link operating capability fields sequentially correspond to K links in the N links; and an $i^{th}$ multi-link operating capability field in the K multi-link operating capability fields corresponds to an $i^{th}$ link in the K links, and is used to indicate whether the $i^{th}$ link that uses a first bandwidth and another link that uses a second bandwidth in the N links support simultaneous transceiving. Alternatively, one multi-link operating capability field in the K multi-link operating capability fields includes a link identifier of an $i^{th}$ link, and corresponds to the $i^{th}$ link; and the multi-link operating capability field corresponding to the $i^{th}$ link is used to indicate whether the $i^{th}$ link that uses a first bandwidth and another link that uses a second bandwidth in the N links support simultaneous transceiving, and i is an integer greater than or equal to 1 and less than or equal to N. Optionally, the multi-link operating capability indication element includes a capability field quantity field, which is used to indicate a quantity of MLO capability fields.

The first bandwidth may include 20 megahertz (MHz), 40 MHz, 80 MHz, 160 MHz, or the like. The second bandwidth may include 20 MHz, 40 MHz, 80 MHz, 160 MHz, or the like. Refer to the foregoing descriptions for a structure of the multi-link operating capability field. Details are not described herein again. A specific implementation may include the following optional manners.

In a first optional manner, K=N, and it indicates that N multi-link operating capability fields exist, an $i^{th}$ multi-link operating capability field in the N multi-link operating capability fields includes N simultaneous transceive information units, a $j^{th}$ simultaneous transceive information unit in the N simultaneous transceive information units is used to indicate whether the $i^{th}$ link that uses the first bandwidth in the N links and a $j^{th}$ link that uses the second bandwidth in the N links support simultaneous transceiving, and j is an integer greater than or equal to 1 and less than or equal to N. The $i^{th}$ multi-link operating capability field in the N multi-link operating capability fields may alternatively include S simultaneous transceive information units, and S represents a quantity of all the links supported by the first multi-link device.

Figure 16:
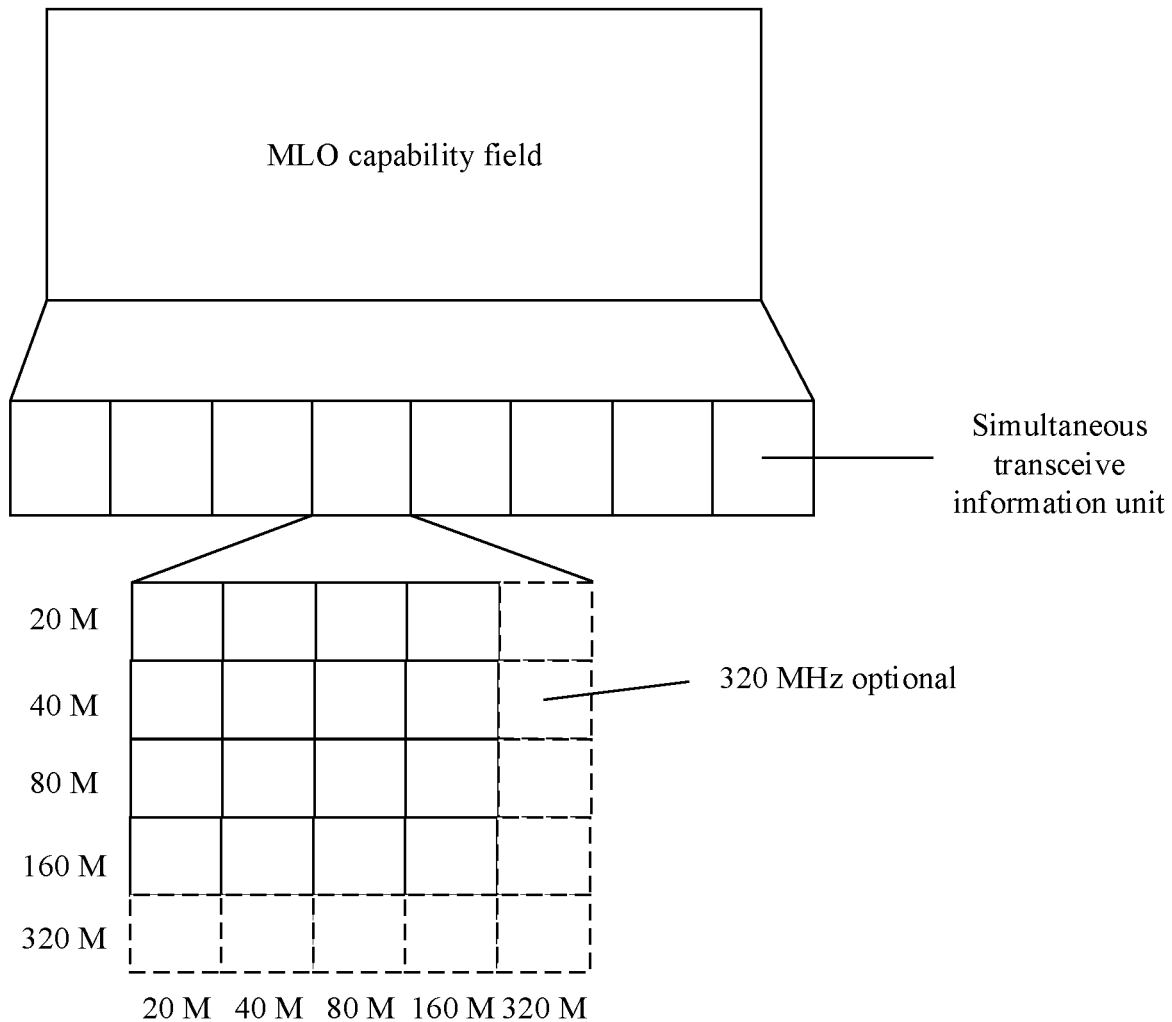
FIG. 16 is a schematic diagram of a structure of another multi-link operating capability field according to an embodiment.

For example, FIG. 16 is a schematic diagram of a structure of a multi-link operating capability indication element according to an embodiment. The MLO capability list field includes a plurality of simultaneous transceive information units. The $j^{th}$ simultaneous transceive information unit of the $i^{th}$ MLO capability field includes $M^2$ bits. M represents a quantity of types of transmission bandwidth sizes that can be used on each link of IEEE 802.11. If a maximum of four types of bandwidth sizes, namely, 20 MHz, 40 MHz, 80 MHz, and 160 MHz, can be used on each link, M=4 and each simultaneous transceive information unit includes 16 bits. If a maximum of five types of bandwidth sizes, namely, 20 MHz, 40 MHz, 80 MHz, 160 MHz, and 320 MHz, can be used on each link, M=5 and each simultaneous transceive information unit includes 25 bits. The $i^{th}$ MLO capability field corresponds to the $i^{th}$ link, and the $j^{th}$ simultaneous transceive information unit corresponds to the $j^{th}$ link. A horizontal direction in FIG. 16 may represent links corresponding to the MLO capability fields, and a vertical direction represents links corresponding to the simultaneous transceive information units. The links represented by the horizontal direction and the vertical direction may alternatively be interchanged. The following describes a meaning of the simultaneous transceive information unit by using 16 bits and 25 bits as examples.

For the 16 bits, the first four bits represent whether receiving of the $i^{th}$ link respectively by using 20 MHz, 40 MHz, 80 MHz, and 160 MHz is affected by sending of the $i^{th}$ link by using 20 MHz. If a bit is set to 1, it indicates that normal receiving is not affected, that is, simultaneous transceiving can be performed; or if the bit is set to 0, it indicates that normal receiving is affected, that is, simultaneous transceiving cannot be performed. The fifth to eighth bits represent whether receiving of the $j^{th}$ link respectively by using 20 MHz, 40 MHz, 80 MHz, and 160 MHz is affected by sending of the $i^{th}$ link by using 40 MHz. If a bit is set to 1, it indicates that normal receiving is not affected; or if the bit is set to 0, it indicates that normal receiving is affected. The ninth to $12^{th}$ bits represent whether receiving of the $j^{th}$ link respectively by using 20 MHz, 40 MHz, 80 MHz, and 160 MHz is affected by sending of the $i^{th}$ link by using 80 MHz. If a bit is set to 1, it indicates that normal receiving is not affected; or if the bit is set to 0, it indicates that normal receiving is affected. The $13^{th}$ to $16^{th}$ bits represent whether receiving of the $j^{th}$ link respectively by using 20 MHz, 40 MHz, 80 MHz, and 160 MHz is affected by sending of the $i^{th}$ link by using 160 MHz. If a bit is set to 1, it indicates that normal receiving is not affected; or if the bit is set to 0, it indicates that normal receiving is affected. 0 or 1 may alternatively indicate an opposite meaning. Details are not described herein again.

For the 25 bits, the first five bits represent whether receiving of the $j^{th}$ link respectively by using 20 MHz, 40 MHz, 80 MHz, 160 MHz, and 320 MHz is affected by sending of the $i^{th}$ link by using 20 MHz. If a bit is set to 1, it indicates that normal receiving is not affected; or if the bit is set to 0, it indicates that normal receiving is affected. The sixth to $10^{th}$ bits represent whether receiving of the $i^{th}$ link respectively by using 20 MHz, 40 MHz, 80 MHz, 160 MHz, and 320 MHz is affected by sending of the $i^{th}$ link by using 40 MHz. If a bit is set to 1, it indicates that normal receiving is not affected; or if the bit is set to 0, it indicates that normal receiving is affected. The $11^{th}$ to $15^{th}$ bits represent whether receiving of the $j^{th}$ link respectively by using 20 MHz, 40 MHz, 80 MHz, 160 MHz, and 320 MHz is affected by sending of the $i^{th}$ link by using 80 MHz. If a bit is set to 1, it indicates that normal receiving is not affected; or if the bit is set to 0, it indicates that normal receiving is affected. The $16^{th}$ to $20^{th}$ bits represent whether receiving of the $j^{th}$ link respectively by using 20 MHz, 40 MHz, 80 MHz, 160 MHz, and 320 MHz is affected by sending of the $i^{th}$ link by using 160 MHz. If a bit is set to 1, it indicates that normal receiving is not affected; or if the bit is set to 0, it indicates that normal receiving is affected. The $21^{st}$ to $25^{th}$ bits represent whether receiving of the $j^{th}$ link respectively by using 20 MHz, 40 MHz, 80 MHz, 160 MHz, and 320 MHz is affected by sending of the $i^{th}$ link by using 320 MHz. If a bit is set to 1, it indicates that normal receiving is not affected; or if the bit is set to 0, it indicates that normal receiving is affected. 0 or 1 may alternatively indicate an opposite meaning. Details are not described herein again.

In a second optional manner, K=N-1, and it indicates that N-1 multi-link operating capability fields exist. An $i^{th}$ multi-link operating capability field in the N-1 multi-link operating capability fields includes N-i simultaneous transceive information units, a $j^{th}$ simultaneous transceive information unit in the N-i simultaneous transceive information units is used to indicate whether the $i^{th}$ link that uses the first bandwidth in the N links and an $(i+j)^{th}$ link that uses the second bandwidth in the N links support simultaneous transceiving, and j is an integer greater than or equal to 1 and less than or equal to N. The $j^{th}$ simultaneous transceive information unit of the $i^{th}$ MLO capability field includes $M^2$ bits. A meaning of M is the same as that in the foregoing descriptions. Details are not described herein again.

For the 16 bits, the first four bits represent whether receiving of the $(i+j)^{th}$ link respectively by using 20 MHz, 40 MHz, 80 MHz, and 160 MHz is affected by sending of the $i^{th}$ link by using 20 MHz. If a bit is set to 1, it indicates that normal receiving is not affected; or if the bit is set to 0, it indicates that normal receiving is affected. The fifth to eighth bits represent whether receiving of the $(i+j)^{th}$ link respectively by using 20 MHz, 40 MHz, 80 MHz, and 160 MHz is affected by sending of the $i^{th}$ link by using 40 MHz. If a bit is set to 1, it indicates that normal receiving is not affected; or if the bit is set to 0, it indicates that normal receiving is affected. The ninth to $12^{th}$ bits represent whether receiving of the $(i+j)^{th}$ link respectively by using 20 MHz, 40 MHz, 80 MHz, and 160 MHz is affected by sending of the $i^{th}$ link by using 80 MHz. If a bit is set to 1, it indicates that normal receiving is not affected; or if the bit is set to 0, it indicates that normal receiving is affected. The $13^{th}$ to $16^{th}$ bits represent whether receiving of the $(i+j)^{th}$ link respectively by using 20 MHz, 40 MHz, 80 MHz, and 160 MHz is affected by sending of the $i^{th}$ link by using 160 MHz. If a bit is set to 1, it indicates that normal receiving is not affected; or if the bit is set to 0, it indicates that normal receiving is affected. 0 or 1 may alternatively indicate an opposite meaning. Details are not described herein again.

For the 25 bits, the first five bits represent whether receiving of the $(i+j)^{th}$ link respectively by using 20 MHz, 40 MHz, 80 MHz, 160 MHz, and 320 MHz is affected by sending of the $i^{th}$ link by using 20 MHz. If a bit is set to 1, it indicates that normal receiving is not affected; or if the bit is set to 0, it indicates that normal receiving is affected. The sixth to $10^{th}$ bits represent whether receiving of the $(i+j)^{th}$ link respectively by using 20 MHz, 40 MHz, 80 MHz, 160 MHz, and 320 MHz is affected by sending of the $i^{th}$ link by using 40 MHz. If a bit is set to 1, it indicates that normal receiving is not affected; or if the bit is set to 0, it indicates that normal receiving is affected. The $11^{th}$ to $15^{th}$ bits represent whether receiving of the $(i+j)^{th}$ link respectively by using 20 MHz, 40 MHz, 80 MHz, 160 MHz, and 320 MHz is affected by sending of the $i^{th}$ link by using 80 MHz. If a bit is set to 1, it indicates that normal receiving is not affected; or if the bit is set to 0, it indicates that normal receiving is affected. The $16^{th}$ to $20^{th}$ bits represent whether receiving of the $(i+j)^{th}$ link respectively by using 20 MHz, 40 MHz, 80 MHz, 160 MHz, and 320 MHz is affected by sending of the $i^{th}$ link by using 160 MHz. If a bit is set to 1, it indicates that normal receiving is not affected; or if the bit is set to 0, it indicates that normal receiving is affected. The $21^{st}$ to $25^{th}$ bits represent whether receiving of the $(i+j)^{th}$ link respectively by using 20 MHz, 40 MHz, 80 MHz, 160 MHz, and 320 MHz is affected by sending of the $i^{th}$ link by using 320 MHz. If a bit is set to 1, it indicates that normal receiving is not affected; or if the bit is set to 0, it indicates that normal receiving is affected. 0 or 1 may alternatively indicate an opposite meaning. Details are not described herein again. When this operation manner is used, signaling overheads can be reduced.

It should be noted that, in the foregoing embodiment, "normal receiving is affected" means that simultaneous transceiving cannot be performed, and "normal receiving is not affected" means that simultaneous transceiving can be performed.

The following describes an implementation of the multi-link operating capability indication element when the frequency location factor is considered.

That one multi-link operating capability field corresponds to one link includes: Sequences of the K multi-link operating capability fields sequentially correspond to K links in the N links; and an $i^{th}$ multi-link operating capability field in the K multi-link operating capability fields corresponds to an $i^{th}$ link in the K links, and is used to indicate a minimum frequency separation that is allowed when the $i^{th}$ link and another link in the N links perform simultaneous transceiving, and i is an integer greater than or equal to 1 and less than or equal to N. Alternatively, one multi-link operating capability field in the K multi-link operating capability fields includes a link identifier of an $i^{th}$ link, and corresponds to the $i^{th}$ link; and the multi-link operating capability field corresponding to the $i^{th}$ link is used to indicate a minimum frequency separation that is allowed when the $i^{th}$ link and another link in the N links perform simultaneous transceiving, and i is an integer greater than or equal to 1 and less than or equal to N. Optionally, the multi-link operating capability indication element includes a capability field quantity field, which is used to indicate a quantity of capability fields.

In an optional manner, the multi-link operating capability list field includes a common frequency separation subfield, and the common frequency separation subfield is used to indicate a minimum frequency separation that is allowed when two links in the N links perform simultaneous transceiving. The receiving device may determine, based on an actual working frequency separation between two links, and the minimum frequency separation indicated by the common frequency separation subfield, whether the two links support simultaneous transceiving. If the actual working frequency separation is not less than a value of the frequency separation subfield, simultaneous transceiving is supported.

In another optional manner, K is equal to N, and it indicates that N multi-link operating capabilities exist, and the $i^{th}$ multi-link operating capability field in the N multi-link operating capabilities includes N frequency separation subfields, and a $j^{th}$ frequency separation subfield in the N frequency separation subfields is used to indicate a minimum frequency separation that is allowed when the $i^{th}$ link in the N links and a $j^{th}$ link in the N links perform simultaneous transceiving, and j is an integer greater than or equal to 1 and less than or equal to N. Optionally, the $i^{th}$ multi-link operating capability field may alternatively include frequency separation subfields with a quantity of all the links. A $j^{th}$ frequency separation subfield is used to indicate a minimum frequency separation that is allowed when the $i^{th}$ link and the $j^{th}$ link in all the links perform simultaneous transceiving. If a frequency separation between a frequency location of a bandwidth occupied by the $i^{th}$ link when the $i^{th}$ link performs sending and a frequency location of a bandwidth occupied by the $j^{th}$ link when the $j^{th}$ link performs receiving is less than a value of the frequency separation subfield, simultaneous transceiving is not supported. Otherwise, simultaneous transceiving is allowed. When the frequency separation between the frequency location of the bandwidth occupied by the $i^{th}$ link when the $i^{th}$ link performs sending and the frequency location of the bandwidth occupied by the $j^{th}$ link when the $j^{th}$ link performs receiving is equal to the value of the frequency separation subfield, simultaneous transceiving may be supported or may not be supported.

Figure 17:
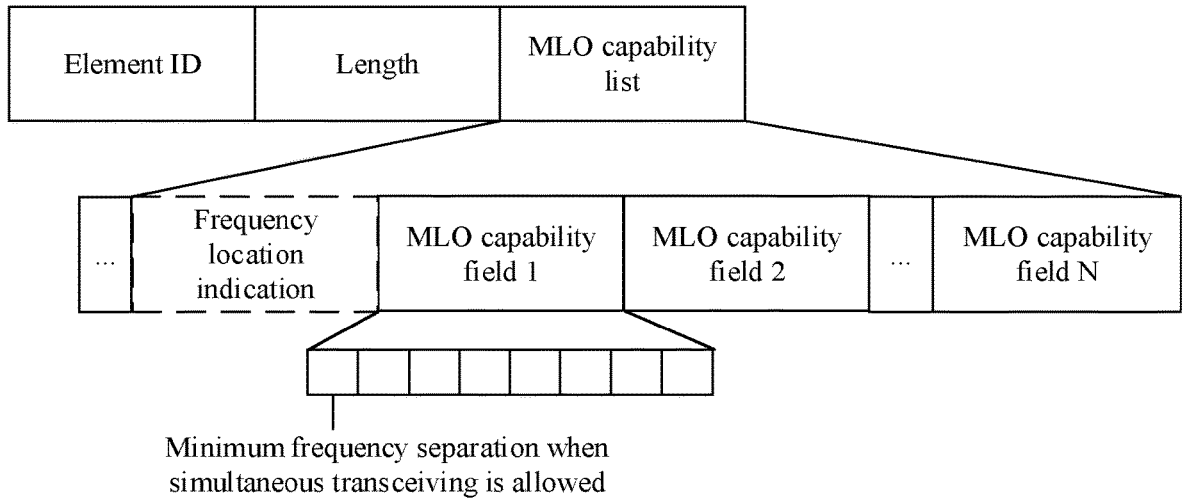
FIG. 17 is a schematic diagram of a structure of another multi-link operating capability indication element according to an embodiment.

For example, FIG. 17 is a schematic diagram of a structure of a multi-link operating capability indication element according to an embodiment. The MLO capability field list includes N MLO capability fields. The first MLO capability field includes N frequency separation subfields. The second frequency separation subfield in the N frequency separation subfields is used to indicate a minimum frequency separation that is allowed when the first link and the second link perform simultaneous transceiving, and the third frequency separation subfield in the N frequency separation subfields is used to indicate a minimum frequency separation that is allowed when the first link and the third link perform simultaneous transceiving, and so on.

In another optional manner, K=N-1, and it indicates that N-1 multi-link operating capabilities exist, and the $i^{th}$ multi-link operating capability field in the N-1 multi-link operating capabilities includes N-i frequency separation subfields, and a $j^{th}$ frequency separation subfield in the N-i frequency separation subfields is used to indicate a minimum frequency separation that is allowed when the $i^{th}$ link in the N links and an $(i+j)^{th}$ link in the N links perform simultaneous transceiving, and j is an integer greater than or equal to 1 and less than or equal to N. If a frequency separation between a frequency location of a bandwidth occupied by the $i^{th}$ link when the $i^{th}$ link performs sending and a frequency location of a bandwidth occupied by the $(i+j)^{th}$ link when the $(i+j)^{th}$ link performs receiving is less than a value of the frequency separation subfield, simultaneous transceiving is not supported. Otherwise, simultaneous transceiving is allowed. When this indication manner is used, signaling overheads can be reduced.

The foregoing frequency separation between two links may be a distance between center frequencies of the two links or a distance between edge frequencies of the two links. The distance between the edge frequencies of the two links may be a distance between an end frequency of a bandwidth of one link and a start frequency of a bandwidth of the other link, or a distance between start frequencies on respective bandwidths of the two links, or a distance between end frequencies on respective bandwidths of the two links. This is not limited herein.

Optionally, the multi-link operating capability list field includes a frequency location indication field. In an implementation, the frequency location indication field is used to indicate that the minimum frequency separation is a minimum value of the distance between the center frequencies of the two links in the N links or a minimum value of the distance between the edge frequencies of the two links. In another implementation, the frequency location indication field is used to indicate the minimum frequency separation in the MLO capability field (of the minimum value of the distance between the center frequencies of the two links, or the minimum value of the distance between the edge frequencies of the two links).

For example, as shown in FIG. 17, the MLO capability list field includes a frequency location indication field. If a value of the frequency location indication field is 1, it indicates that the minimum frequency separation in the MLO capability field is the minimum value of the distance between the center frequencies of the two links. If the value of the frequency location indication field is 0, it indicates that the minimum frequency separation is the minimum value of the distance between the edge frequencies of the two links. 0 or 1 may alternatively indicate an opposite meaning. 0 represents the minimum value of the distance between the center frequencies, and 1 represents the minimum value of the distance between the edge frequencies. This is not limited herein.

For another example, as shown in FIG. 17, the MLO capability list field includes a frequency location indication field. If a value of the frequency location indication field is 00, it indicates that the MLO capability list field does not indicate the minimum frequency separation, and instead, it is indicated by using a transceive capability indication bitmap, whether any two of the links support simultaneous transceiving. If the value of the frequency location indication field is 10, it indicates that the minimum frequency separation in the MLO capability field is the minimum value of the distance between the center frequencies of the two links. If the value of the frequency location indication field is 11, it indicates that the minimum frequency separation is the minimum value of the distance between the edge frequencies of the two links. The value of the frequency location indication field may be randomly combined with a corresponding indication meaning. This is not limited herein.

The following describes an implementation of the multi-link operating capability indication element when the power factor is considered.

In an implementation, the multi-link operating capability list field includes a transmit power level field, the transmit power level field is used to indicate a transmit power threshold when two links in the N links support simultaneous transceiving, and the transmit power threshold is a common transmit power threshold. The transmit power level field is a signed integer, and a unit of the transmit power level field may be decibel milliwatts (dBm). The receiving device may determine, based on the transmit power threshold indicated by the transmit power level field and actual transmit power on one link, whether the link and another link that are of the first multi-link device support simultaneous transceiving. For example, the receiving device may first receive the radio frame sent by the first multi-link device. The radio frame includes the multi-link operating capability list field. The multi-link operating capability list field includes the transmit power threshold indicated by the transmit power level field. Then, the first multi-link device may specify the actual transmit power of the first multi-link device in a trigger frame or a transmit opportunity (TXOP) window. After determining the actual transmit power of the first multi-link device, the receiving device may compare the actual transmit power with the transmit power threshold. If the actual transmit power is not greater than the transmit power threshold, it is determined that two links support simultaneous transceiving. If the actual transmit power is greater than the transmit power threshold, it is determined that the two links do not support simultaneous transceiving.

Figure 18:
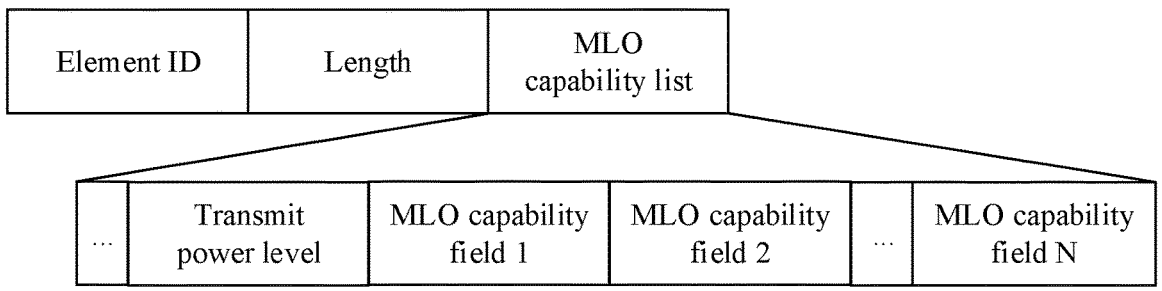
FIG. 18 is a schematic diagram of a structure of another multi-link operating capability indication element according to an embodiment.

For example, FIG. 18 is a schematic diagram of a structure of a multi-link operating capability indication element according to an embodiment. The multi-link operating capability list field includes the transmit power level field, and the transmit power level field is used to indicate transmit power thresholds of a link 1, a link 2, . . . , and a link N. Optionally, the MLO capability field may include the foregoing transceive capability indication bitmap or simultaneous transceive information units. In an example, if the $i^{th}$ MLO capability field includes the transceive capability indication bitmap, and if a value of the $j^{th}$ bit in the transceive capability indication bitmap is 0, it indicates that the two links (the $i^{th}$ link and the $j^{th}$ link) do not support simultaneous transceiving. If the $j^{th}$ bit in the $i^{th}$ MLO capability field is set to 1, it indicates that if the actual transmit power is not greater than the transmit power threshold indicated by the transmit power level field, simultaneous transceiving is supported; otherwise, simultaneous transceiving is not supported. After the receiving device receives the multi-link operating capability indication element, if the simultaneous transceive information unit in the MLO capability field is set to 1, and the actual transmit power is not greater than the transmit power threshold indicated by the transmit power level field, it is determined that the two links (the $i^{th}$ link and the $j^{th}$ link) support simultaneous transceiving; or if the $j^{th}$ bit in the transceive capability indication bitmap in the $i^{th}$ MLO capability field is set to 1, and the actual transmit power is greater than the transmit power threshold indicated by the transmit power level field, it is determined that the two links (the $i^{th}$ link and the $j^{th}$ link) do not support simultaneous transceiving.

In another implementation, one transmit power level field corresponds to one multi-link operating capability field, and the transmit power level field is used to indicate a transmit power threshold when a link corresponding to the multi-link operating capability field and another link support simultaneous transceiving. In this implementation, the N links respectively correspond to respective transmit power thresholds. The receiving device may determine, based on the transmit power threshold indicated by the transmit power level field and actual transmit power on one link, whether the link and another link that are of the first multi-link device support simultaneous transceiving.

Figure 19:
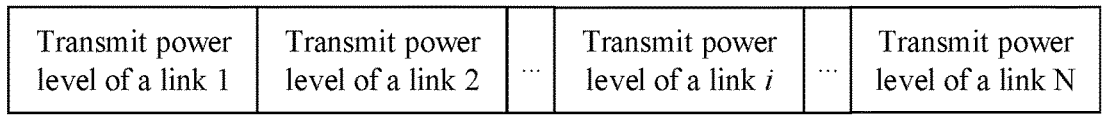
FIG. 19 is a schematic diagram of a structure of another transmit power level field according to an embodiment.

For example, FIG. 19 is a schematic diagram of a structure of a transmit power level field according to an embodiment. The multi-link operating capability list field includes N MLO capability fields and N transmit power level fields, and one MLO capability field corresponds to one transmit power level field. The transmit power level field is used to indicate the transmit power threshold of the link corresponding to the MLO capability field.

In another implementation, the multi-link operating capability list field includes N-1 transmit power level list fields and N-1 multi-link operating capability fields. The $i^{th}$ multi-link operating capability field corresponds to an $i^{th}$ transmit power level list field. The $i^{th}$ multi-link operating capability field corresponds to the $i^{th}$ link. The $i^{th}$ transmit power level list field includes N-i transmit power level fields. An $i^{th}$ transmit power level field in the N-i transmit power level fields is used to indicate a transmit power threshold of the $i^{th}$ link and the $(i+j)^{th}$ link. If the receiving device determines that actual transmit power of at least one of the $i^{th}$ link and the $(i+j)^{th}$ link is greater than the transmit power threshold, simultaneous transceiving is not supported. If the receiving device determines that neither the actual transmit power of the $i^{th}$ link nor the actual transmit power of the $(i+j)^{th}$ link is greater than the transmit power threshold, simultaneous transceiving is supported.

Figure 20:
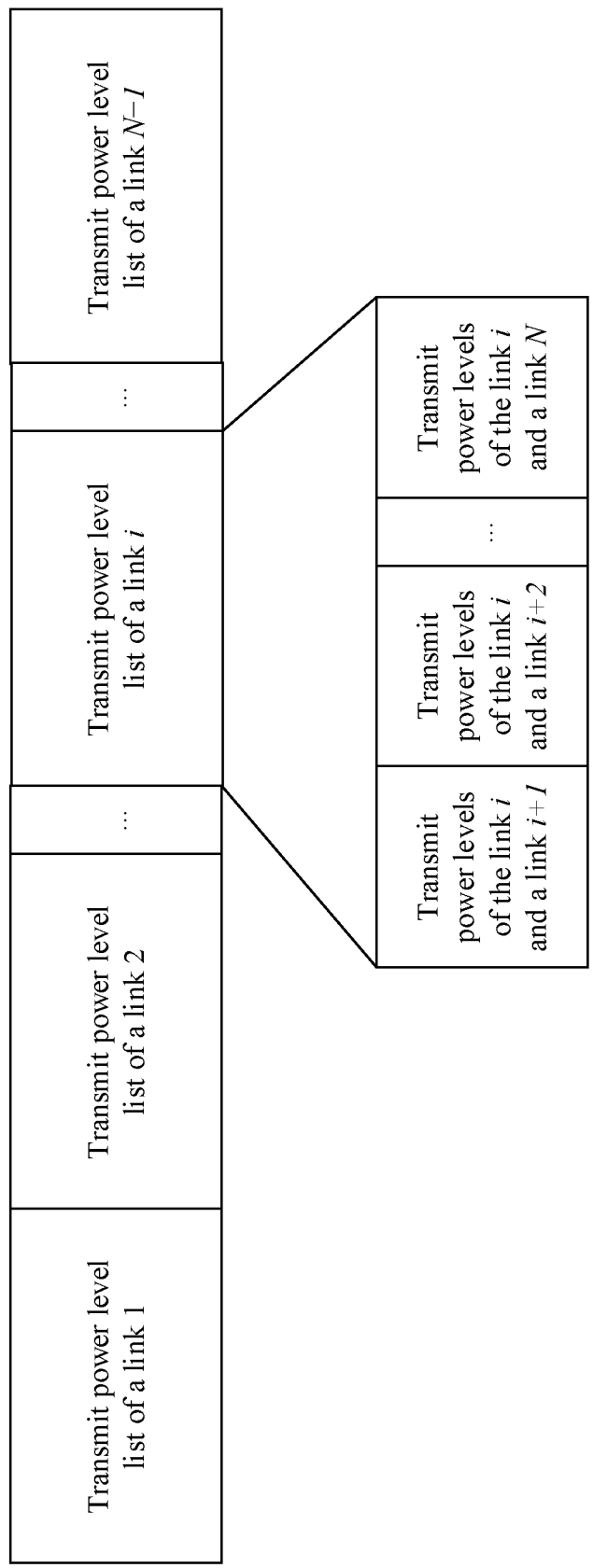
FIG. 20 is a schematic diagram of a structure of another transmit power level field according to an embodiment.

For example, FIG. 20 is a schematic diagram of a structure of a transmit power level field according to an embodiment. A reference power level list field of the link i includes a transmit power level field of the link i and a link i+1, a transmit power level field of the link i and a link i+2, . . . , and a transmit power level field of the link i and a link N. The transmit power level field of the link i and the link i+1 is used to indicate a transmit power threshold of the $i^{th}$ link and the $(i+1)^{th}$ link, and so on. Details are not described herein again.

It should be noted that, when N links correspond to one common transmit power threshold, the common transmit power threshold may be carried before the multi-link operating capability field; or when one link corresponds to its own transmit power level field, the transmit power level field may be included in the multi-link operating capability field corresponding to each link, or may be carried before the multi-link operating capability field, and the transmit power level fields are in a one-to-one correspondence with a plurality of multi-link operating capability fields.

It should be noted that, the transmit power level field may be used separately, to indicate whether two links in the N links support simultaneous transceiving, or specific content included in the MLO capability field under impact of the frequency location factor and the bandwidth factor may also be considered, to indicate whether two links in the N links support simultaneous transceiving. For example, the MLO capability field shown in FIG. 18 may use the MLO capability field shown in FIG. 10 to FIG. 17 in the foregoing embodiment. For example, if the MLO capability field shown in FIG. 18 is combined with the MLO capability field in FIG. 16, the MLO capability field corresponds to the $i^{th}$ link, and the first bit in the $j^{th}$ simultaneous transceive information unit indication in the MLO capability field corresponds to 20 MHz*20 MHz, and is set to 1. If the actual transmit power is not greater than the transmit power threshold indicated by the transmit power level field, it is determined that the two links (the $i^{th}$ link that uses 20 MHz and the $j^{th}$ link that uses 20 MHz) support simultaneous transceiving. For a specific implementation, refer to the foregoing descriptions. Details are not described herein again.

It may be understood that, because the quantity K of the capability fields is related to the quantity N of the links, the capability field quantity field may alternatively be replaced with a link quantity field, to indicate the quantity N of the links. Either based on the capability field quantity field or the link quantity field, the receiving device can obtain the quantity N of the links and the quantity K of the capability fields.

In this embodiment, one multi-link operating capability field is introduced into the radio frame, and the multi-link operating capability field indicates whether the corresponding link and the another link in the N links support simultaneous transceiving, so that the receiving device can determine simultaneous transceive capabilities of the plurality of links, to improve transmission efficiency.

The foregoing describes in detail the method in embodiments of this disclosure. The following provides apparatuses in embodiments of this disclosure.

Figure 21:
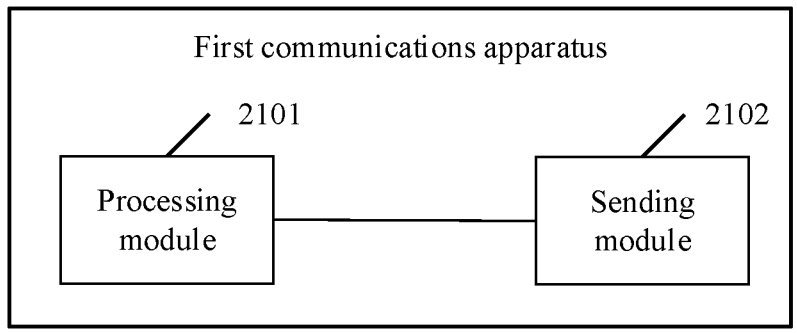
FIG. 21 is a schematic diagram of a structure of a first communications apparatus according to an embodiment.

FIG. 21 is a schematic diagram of a structure of a first communications apparatus according to an embodiment. The first communications apparatus may be configured to implement any method and function related to the first multi-link device in any one of the foregoing embodiments. The first communications apparatus may include a processing module 2101 and a sending module 2102. Optionally, the sending module 2102 corresponds to a radio frequency circuit included in the first multi-link device. Detailed descriptions of the modules are as follows:

In an embodiment, the processing module 2101 is configured to generate a radio frame, where the first multi-link device works on a plurality of links; and the sending module 2102 is configured to send the radio frame, where the radio frame includes link information of at least one link in the plurality of links, and link information of one link is used to indicate the link and corresponds to a link identifier of the link.

Optionally, the sending module 2102 is further configured to send a multi-link indexing element, where the multi-link indexing element includes an MLI info field, the MLI info field includes a link identifier or a bitmap of a link selected from the plurality of links, and the bitmap is used to indicate whether a link in the plurality of links is selected.

In another embodiment, the processing module 2101 is configured to generate a radio frame, where the first multi-link device works on N links, and N is an integer greater than 1; and the sending module 2102 is configured to send the radio frame, where the radio frame includes a multi-link operating capability list field, the multi-link operating capability list field includes K multi-link operating capability fields, one multi-link operating capability field corresponds to one link in the N links, the multi-link operating capability field is used to indicate whether the corresponding link and another link in the N links support simultaneous transceiving, and K is an integer greater than or equal to 1 and less than or equal to N.

Refer to the descriptions in the foregoing method embodiments for content and a function of an element or a field included in the radio frame. Details are not described herein again.

It should be noted that, for implementation of the modules, refer to corresponding descriptions in the method embodiments shown in FIG. 3 and FIG. 9. The modules perform the methods and the functions performed by the first multi-link device in the foregoing embodiments.

Figure 22:
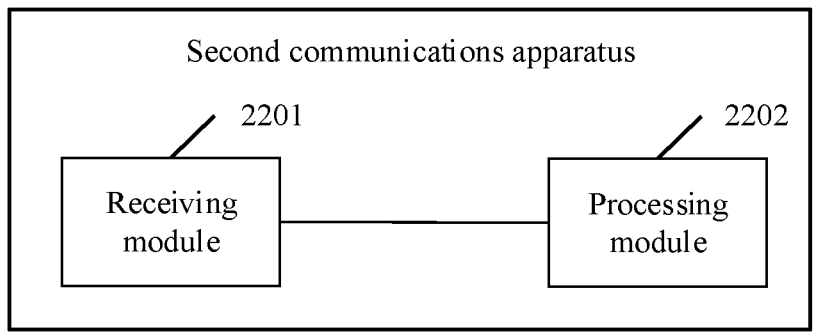
FIG. 22 is a schematic diagram of a structure of a second communications apparatus according to an embodiment.

FIG. 22 is a schematic diagram of a structure of a second communications apparatus according to an embodiment. The second communications apparatus may be configured to implement any method and function related to a receiving device in any one of the foregoing embodiments. The second communications apparatus may include a receiving module 2201 and a processing module 2202. Optionally, the receiving module 2102 corresponds to a baseband circuit included in the receiving device. Detailed descriptions of the modules are as follows:

In an embodiment, the receiving module 2201 is configured to receive a radio frame sent by a first link device, where the first multi-link device works on a plurality of links, the radio frame includes link information of at least one link in the plurality of links, and link information of one link is used to indicate the link and corresponds to a link identifier of the link; and the processing module 2202 is configured to parse the radio frame, to obtain the link information of the at least one link and a link identifier corresponding to the at least one link.

Optionally, the receiving module 2201 is further configured to receive a multi-link indexing element sent by the first multi-link device, where the multi-link indexing element includes an MLI info field, the MLI info field includes a link identifier or a bitmap of a link selected from the plurality of links, and the bitmap is used to indicate whether a link in the plurality of links is selected.

In another embodiment, the receiving module 2201 is configured to receive a radio frame sent by a first multi-link device, where the first multi-link device works on N links, the radio frame includes a multi-link operating capability list field, the multi-link operating capability list field includes K multi-link operating capability fields, one multi-link operating capability field corresponds to one link in the N links, the multi-link operating capability field is used to indicate whether the corresponding link and another link in the N links support simultaneous transceiving, N is an integer greater than 1, and K is an integer greater than or equal to 1 and less than or equal to N; and the processing module 2202 is configured to determine, based on the multi-link operating capability field, whether the link corresponding to the multi-link operating capability field and the another link in the N links support simultaneous transceiving.

Refer to the descriptions in the foregoing method embodiments for content and a function of an element or a field included in the radio frame. Details are not described herein again.

It should be noted that, for implementation of the modules, refer to corresponding descriptions in the method embodiments shown in FIG. 3 and FIG. 9. The modules perform the methods and the functions performed by the first multi-link device in the foregoing embodiments.

Figure 23:
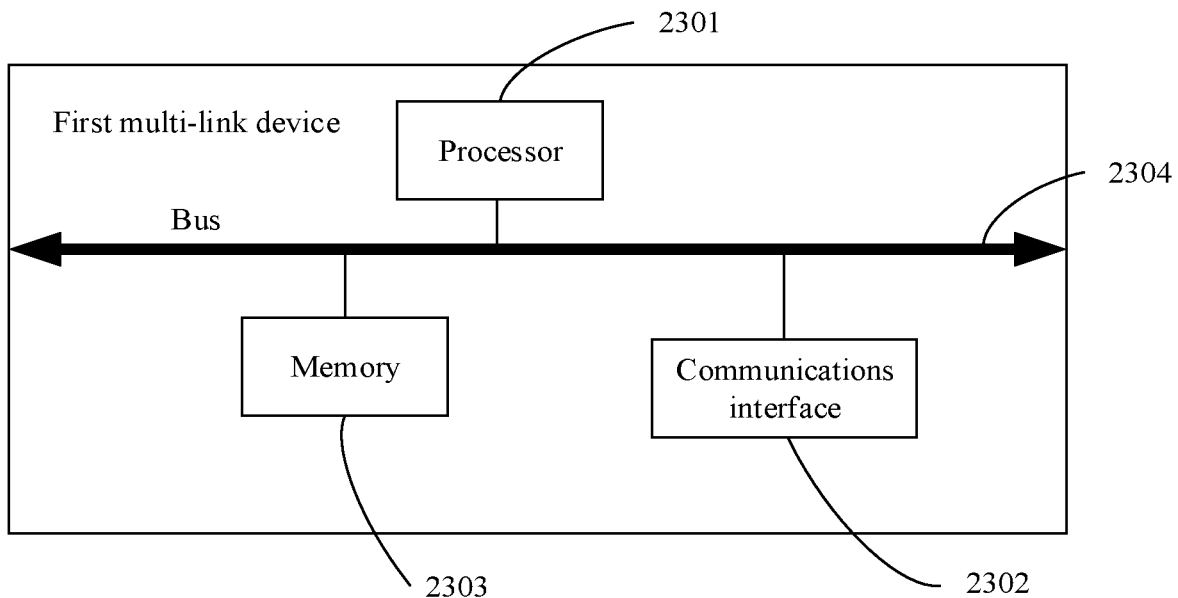
FIG. 23 is a schematic diagram of a structure of a first multi-link device according to an embodiment.

Still refer to FIG. 23. FIG. 23 is a schematic diagram of a structure of a first multi-link device according to an embodiment. As shown in FIG. 23, the first multi-link device may include at least one processor 2301, at least one communications interface 2302, at least one memory 2303, and at least one communications bus 2304.

The processor 2301 may be a central processing unit (CPU), a general-purpose processor, a digital signal processor (DSP), an application-specific integrated circuit (ASIC), a field-programmable gate array (FPGA), or another programmable logic device, a transistor logic device, a hardware component, or any combination thereof. The processor 2301 may implement or execute various example logical blocks, modules, and circuits described with reference to content in this disclosure. Alternatively, the processor may be a combination of processors implementing a computing function, for example, a combination of one or more microprocessors, or a combination of the digital signal processor and a microprocessor. The communications bus 2304 may be a Peripheral Component Interconnect (PCI) bus, an Extended Industry Standard Architecture (EISA) bus, or the like. The bus may be classified into an address bus, a data bus, a control bus, or the like. For ease of representation, only one thick line is used to represent the bus in FIG. 23, but this does not mean that there is only one bus or only one type of bus. The communications bus 2304 is configured to implement connection and communication between these components. The communications interface 2302 in the device in this embodiment is configured to perform signaling or data communication with another node device. The memory 2303 may include a volatile memory, for example, a non-volatile random-access memory (NVRAM), a phase-change random-access memory (PRAM), or a magnetoresistive random-access memory (MRAM). The memory 2303 may further include a nonvolatile memory, for example, at least one magnetic disk storage device, an electrically-erasable programmable read-only memory (EEPROM), a flash memory device such as a not-or (NOR) flash memory or a not- and (NAND) flash memory, or a semiconductor device such as a solid-state drive (SSD). Optionally, the memory 2303 may alternatively be at least one storage apparatus far away from the processor 2301. Optionally, the memory 2303 may further store a set of program code. Optionally, the processor 2301 may further execute programs stored in the memory 2303.

In an embodiment, the processor 2301 is configured to perform the following operation steps: generating a radio frame, where the first multi-link device works on a plurality of links; and sending the radio frame by using the communications interface 2302, where the radio frame includes link information of at least one link in the plurality of links, and link information of one link is used to indicate the link and corresponds to a link identifier of the link.

Optionally, the processor 2301 is further configured to perform the following operation step: sending a multi-link indexing element by using the communications interface 2302, where the multi-link indexing element includes an MLI info field, the MLI info field includes a link identifier or a bitmap of a link selected from the plurality of links, and the bitmap is used to indicate whether a link in the plurality of links is selected.

In another embodiment, the processor 2301 is configured to perform the following operation steps: generating a radio frame, where the first multi-link device works on N links, and N is an integer greater than 1; and sending the radio frame by using the communications interface 2302, where the radio frame includes a multi-link operating capability list field, the multi-link operating capability list field includes K multi-link operating capability fields, one multi-link operating capability field corresponds to one link in the N links, the multi-link operating capability field is used to indicate whether the corresponding link and another link in the N links support simultaneous transceiving, and K is an integer greater than or equal to 1 and less than or equal to N.

Refer to the descriptions in the foregoing method embodiments for content and a function of an element or a field included in the radio frame. Details are not described herein again.

Further, the processor may cooperate with the memory and the communications interface, to perform an operation of the first multi-link device in the foregoing embodiments.

Figure 24:
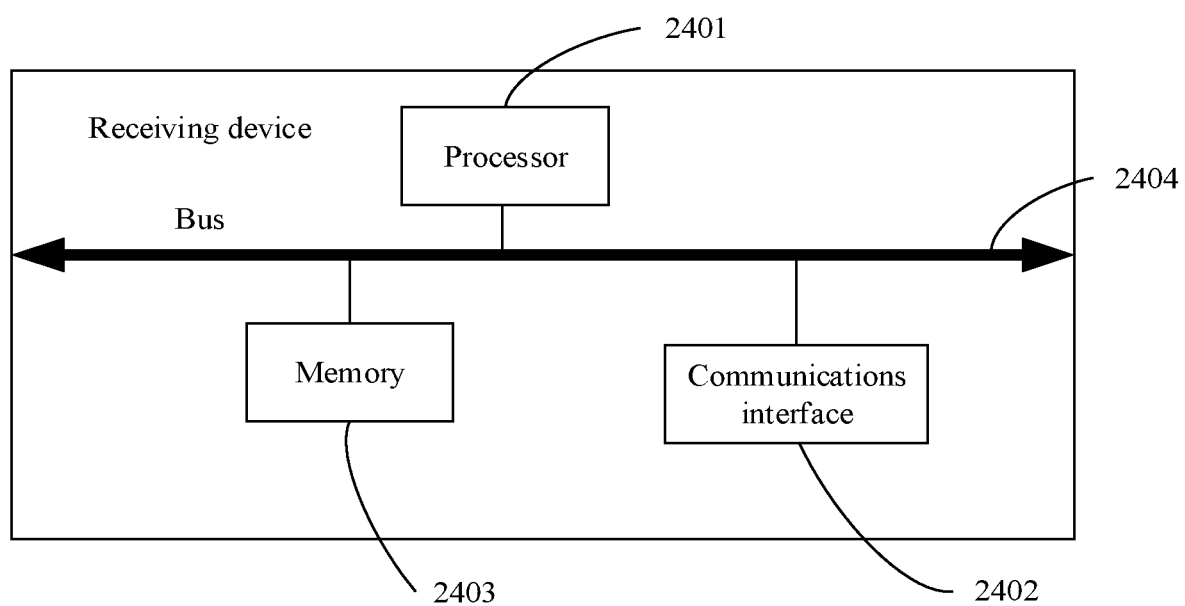
FIG. 24 is a schematic diagram of a structure of a receiving device according to an embodiment.

Still refer to FIG. 24. FIG. 24 is a schematic diagram of a structure of a receiving device according to an embodiment. As shown in the figure, the receiving device may include at least one processor 2401, at least one communications interface 2402, at least one memory 2403, and at least one communications bus 2404.

The processor 2401 may be processors of various types mentioned above. The communications bus 2404 may be a PCI bus, an EISA bus, or the like. The bus may be classified into an address bus, a data bus, a control bus, or the like. For ease of representation, only one thick line is used to represent the bus in FIG. 24, but this does not mean that there is only one bus or only one type of bus. The communications bus 2404 is configured to implement connection and communication between these components. The communications interface 2402 in the device in this embodiment is configured to perform signaling or data communication with another node device. The memory 2403 may be memories of various types mentioned above. Optionally, the memory 2403 may alternatively be at least one storage apparatus far away from the processor 2401. The memory 2403 stores a set of program code, and the processor 2401 executes programs in the memory 2403.

In an embodiment, the processor 2401 is further configured to perform the following operation steps: receiving, by using the communications interface 2402, a radio frame sent by a first link device, where the first multi-link device works on a plurality of links, the radio frame includes link information of at least one link in the plurality of links, and link information of one link is used to indicate the link and corresponds to a link identifier of the link; and parsing the radio frame, to obtain the link information of the at least one link and a link identifier corresponding to the at least one link.

Optionally, the processor 2401 is further configured to perform the following operation step:

The communications interface 2302 is further configured to receive a multi-link indexing element sent by the first multi-link device, where the multi-link indexing element includes an MLI info field, the MLI info field includes a link identifier or a bitmap of a link selected from the plurality of links, and the bitmap is used to indicate whether a link in the plurality of links is selected.

In another embodiment, a radio frame sent by a first multi-link device is received by using the communications interface 2402. The first multi-link device works on N links, the radio frame includes a multi-link operating capability list field, the multi-link operating capability list field includes K multi-link operating capability fields, one multi-link operating capability field corresponds to one link in the N links, the multi-link operating capability field is used to indicate whether the corresponding link and another link in the N links support simultaneous transceiving, N is an integer greater than 1, and K is an integer greater than or equal to 1 and less than or equal to N; and it is determined, based on the multi-link operating capability field, whether the link corresponding to the multi-link operating capability field and the another link in the N links support simultaneous transceiving.

Refer to the descriptions in the foregoing method embodiments for content and a function of an element or a field included in the radio frame. Details are not described herein again.

Further, the processor may cooperate with the memory and the communications interface, to perform an operation of the receiving device in the foregoing embodiments.

An embodiment further provides a chip system. The chip system includes a processor configured to support a first multi-link device or a receiving device in implementing the function in any one of the foregoing embodiments, for example, generating or processing data and/or information in the foregoing methods. In a possible design, the chip system may further include a memory, and the memory is configured to store program instructions and data necessary for a first multi-link device or a receiving device. The chip system may include a chip, or may include a chip and another discrete component.

An embodiment further provides a processor configured to: couple to a memory, and perform any method and function related to a first multi-link device or a receiving device in any one of the foregoing embodiments.

An embodiment further provides a computer program product including instructions. When the computer program product runs on a computer, the computer is enabled to perform the method and the functions of the first multi-link device or the receiving device in any one of the foregoing embodiments.

An embodiment further provides an apparatus configured to perform any method and function related to a first multi-link device or a receiving device in any one of the foregoing embodiments.

An embodiment further provides a wireless communications system. The system includes at least one first multi-link device and at least one receiving device in any one of the foregoing embodiments.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to embodiments are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center integrating one or more usable media. The usable medium may be a magnetic medium (for example, a floppy disk, a hard disk, or a magnetic tape), an optical medium (for example, a digital versatile disc (DVD)), a semiconductor medium (for example, an SSD), or the like.

What is claimed is:

1. A method implemented by a first multi-link device and comprising:
   supporting a plurality of links comprising a first link;
   generating a radio frame comprising link information of the first link, wherein the link information indicates the first link and corresponds to a link identifier of the first link, wherein the radio frame further comprises a multi-band element, wherein the multi-band element comprises the link information, a multi-band control field, and a multi-band connection capability field, wherein the multi-band control field comprises a multi-link indexing present field, and wherein the multi-link indexing present field indicates whether the link identifier exists in the multi-band element; and
   sending the radio frame.

2. The method of claim 1, wherein the multi-link indexing field comprises the link identifier when the multi-link indexing present field indicates that the multi-link indexing field exists in the multi-band element.

3. The method of claim 1, wherein the multi-band element further comprises a pairwise cipher suite list field, wherein the pairwise cipher suite list field comprises a suite selector field, wherein the suite selector field comprises a manufacturer identifier subfield and a suite type subfield, and wherein the suite type subfield comprises the link identifier when the manufacturer identifier subfield has a first value.

4. The method of claim 1, wherein the multi-band element further comprises a multi-band connection capability field, and wherein a reserved bit in the multi-band connection capability field comprises the link identifier when the multi-link indexing present field indicates that the link identifier exists in the multi-band element.

5. The method of claim 1, and-wherein a sequence of the multi-band element is in a one-to-one correspondence with the link identifier.

6. The method of claim 1, wherein the multi-band element further comprises a multi-link indexing allocation field, and wherein the multi-link indexing allocation field comprises the link identifier.

7. The method of claim 1, further comprising sending, after sending the radio frame, a multi-link indexing element comprising a multi-link indexing information field, wherein the multi-link indexing information field comprises the link identifier or a bitmap of the first link, and wherein the bitmap indicates whether the first link is selected.

8. The method of claim 1, wherein the link information comprises a band identifier field, an operating class field, and a channel number.

9. A method implemented by a receiving device and comprising:
   receiving, from a first multi-link device supporting a plurality of links, a radio frame comprising link information of a first link of the links, wherein the link information indicates the first link and corresponds to a link identifier of the first link, wherein the radio frame further comprises a multi-band element, wherein the multi-band element comprises the link information, a multi-band control field, and a multi-band connection capability field, wherein the multi-band control field comprises a multi-link indexing present field, and wherein the multi-link indexing present field indicates whether the link identifier exists in the multi-band element; and
   parsing the radio frame to obtain the link information and the link identifier.

10. The method of claim 9, and wherein the multi-link indexing field comprises the link identifier when the multi-link indexing present field indicates that the multi-link indexing field exists in the multi-band element.

11. The method of claim 9, wherein the multi-band element further comprises pairwise cipher suite list field, wherein the pairwise cipher suite list field comprises a suite selector field, wherein the suite selector field comprises a manufacturer identifier subfield and a suite type subfield, and wherein the suite type subfield comprises the link identifier when the manufacturer identifier subfield has a first value.

12. The method of claim 9, wherein the multi-band element further comprises a multi-band connection capability field, and wherein a reserved bit in the multi-band connection capability field comprises the link identifier when the multi-link indexing present field indicates that the link identifier exists in the multi-band element.

13. The method of claim 9, and-wherein a sequence of the multi-band element is in a one-to-one correspondence with the link identifier.

14. The method of claim 9, wherein the multi-band element further comprises a multi-link indexing allocation field, and wherein the multi-link indexing allocation field comprises the link identifier.

15. The method of claim 9, further comprising receiving, from the first multi-link device after receiving the radio frame, a multi-link indexing element comprising a multi-link indexing information field, wherein the multi-link indexing information field comprises the link identifier or a bitmap of the first link, and wherein the bitmap indicates whether the first link is selected.

16. The method of claim 9, wherein the link information comprises a band identifier field, an operating class field, and a channel number.

17. A first multi-link device comprising:
   a memory configured to store instructions; and
   a processor coupled to the memory and configured to execute the instructions to cause the first multi-link device to:
      support a plurality of links comprising a first link;
      generate a radio frame comprising link information of the first link, wherein the link information indicates the first link and corresponds to a link identifier of the first link, wherein the radio frame further comprises a multi-band element, wherein the multi-band element comprises the link information, a multi-band control field, and a multi-band connection capability field, wherein the multi-band control field comprises a multi-link indexing present field, and wherein the multi-link indexing present field indicates whether the link identifier exists in the multi-band element; and
      send the radio frame.

18. The first multi-link device of claim 17, and wherein the multi-link indexing field comprises the link identifier when the multi-link indexing present field indicates that the multi-link indexing field exists in the multi-band element.

19. The first multi-link device of claim 17, wherein the multi-band element further comprises a pairwise cipher suite list field, wherein the pairwise cipher suite list field comprises a suite selector field, wherein the suite selector field comprises a manufacturer identifier subfield and a suite type subfield, and wherein the suite type subfield comprises the link identifier when the manufacturer identifier subfield has a first value.

20. The first multi-link device of claim 17, wherein the multi-band element further comprises a multi-band connection capability field, and wherein a reserved bit in the multi-band connection capability field comprises the link identifier when the multi-link indexing present field indicates that the link identifier exists in the multi-band element.

* * * * *

UNITED STATES PATENT AND TRADEMARK OFFICE
CERTIFICATE OF CORRECTION

| | | |
|---|---|---|
| PATENT NO. | : 12,262,432 B2 | Page 1 of 1 |
| APPLICATION NO. | : 17/743639 | |
| DATED | : March 25, 2025 | |
| INVENTOR(S) | : Mao Yang et al. | |

It is certified that error appears in the above-identified patent and that said Letters Patent is hereby corrected as shown below:

In the Claims

Claim 13, Column 33, Line 3: "9, and-wherein" should read "9, wherein"

Signed and Sealed this
Twentieth Day of May, 2025

Coke Morgan Stewart
*Acting Director of the United States Patent and Trademark Office*